United States Patent
Ono

(10) Patent No.: US 11,689,682 B2
(45) Date of Patent: Jun. 27, 2023

(54) INFORMATION PROCESSING APPARATUS, INFORMATION PROCESSING SYSTEM, NON-TRANSITORY COMPUTER READABLE MEDIUM STORING INFORMATION PROCESSING PROGRAM, AND INFORMATION PROCESSING METHOD FOR CONTROLLING AVAILABILITY OF EXECUTION OF PLUG-IN

(71) Applicant: FUJIFILM Business Innovation Corp., Tokyo (JP)

(72) Inventor: Yusuke Ono, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/521,797

(22) Filed: Nov. 8, 2021

(65) Prior Publication Data
US 2022/0394153 A1   Dec. 8, 2022

(30) Foreign Application Priority Data
Jun. 7, 2021   (JP) .................................. 2021-095129

(51) Int. Cl.
*H04N 1/44* (2006.01)
*H04N 1/00* (2006.01)

(52) U.S. Cl.
CPC ....... *H04N 1/4426* (2013.01); *H04N 1/00204* (2013.01)

(58) Field of Classification Search
CPC .................................................... H04N 1/4426
USPC .......................................................... 358/1.15
See application file for complete search history.

(56) References Cited

U.S. PATENT DOCUMENTS

| | | | | |
|---|---|---|---|---|
| 2006/0206931 A1* | 9/2006 | Dillaway | ............ | H04L 63/0823 726/9 |
| 2011/0026064 A1* | 2/2011 | Kato | ...................... | H04N 1/442 358/1.14 |
| 2013/0242331 A1* | 9/2013 | Ando | ................... | H04N 1/0097 358/1.13 |
| 2019/0108070 A1* | 4/2019 | Kasahara | .............. | G06F 9/5016 |

FOREIGN PATENT DOCUMENTS

| | | |
|---|---|---|
| JP | 2007122603 | 5/2007 |
| JP | 2011154473 | 8/2011 |
| JP | 2012008736 | 1/2012 |
| JP | 2012027823 | 2/2012 |

* cited by examiner

*Primary Examiner* — Jacky X Zheng
(74) *Attorney, Agent, or Firm* — JCIPRNET

(57) ABSTRACT

An information processing apparatus includes a processor configured to receive target authorization information to be collated, from an execution request source of a plug-in that extends access from an outside, in a case of executing the plug-in, and perform a process of controlling availability of execution of the plug-in, by using unique predetermined authorization information owned by the plug-in and the target authorization information.

8 Claims, 20 Drawing Sheets

INFORMATION PROCESSING APPARATUS, INFORMATION PROCESSING SYSTEM, NON-TRANSITORY COMPUTER READABLE MEDIUM STORING INFORMATION PROCESSING PROGRAM, AND INFORMATION PROCESSING METHOD FOR CONTROLLING AVAILABILITY OF EXECUTION OF PLUG-IN

CROSS-REFERENCE TO RELATED APPLICATIONS

This application is based on and claims priority under 35 USC 119 from Japanese Patent Application No. 2021-095129 filed Jun. 7, 2021.

BACKGROUND

(i) Technical Field

The present invention relates to an information processing apparatus, an information processing system, a non-transitory computer readable medium storing an information processing program, and an information processing method.

(ii) Related Art

In JP2012-27823A, a technique is proposed in which in a case of printing on a desired device by using a function added to a printer driver of an information processing apparatus, the presence or absence of the function in the device is determined, and in a case where the device does not have the function, the function is added to the device by using an installation package for printer installation of the function, and the function is removed from the device after printing using the function is completed.

JP2011-154473A proposes a program that installs a driver plug-in for a printer driver corresponding to a function plug-in for executing a function of an image forming apparatus and extends the function of the printer driver. Specifically, the program causes a computer to execute a request step of requesting the image forming apparatus to send plug-in identification information for identifying the function plug-in and user authentication information, in a case where the driver plug-in is installed, an acquisition step of acquiring a result indicating whether or not the user indicated by the user authentication information can use the function plug-in indicated by the plug-in identification information, in the image forming apparatus, and an installation step of starting installation of the driver plug-in in a case where the acquired result indicates that the function plug-in is available.

In JP2012-8736A proposes an image forming apparatus for installing a function plug-in. Specifically, the image forming apparatus includes a management unit that manages availability information indicating whether or not the user can use a function plug-in, a receiving unit that receives plug-in identification information for identifying the function plug-in and user authentication information from a first information processing apparatus, a determination unit that determines whether or not the user who has succeeded in authentication can use the function plug-in indicated by the plug-in identification information by using the availability information, in a case where the authentication is successful using the received user authentication information, a transmission unit that transmits the determined approval-requested determination result to the first information processing apparatus, a creation unit that creates an approval screen in which approval is available on the Web, in a case where an approval request is received from the first information processing apparatus, and a transmission unit that transmits the URL of the approval screen to a second information processing apparatus.

JP2007-122603A proposes an application program in which authentication data is acquired from a plug-in, it is determined whether or not the acquired authentication data is registered in a data table, in a case where the acquired authentication data is registered in the data table, it is determined that the plug-in is valid, and confidential data is passed to the plug-in, or in a case where the acquired authentication data is not registered in the data table, it is determined that the plug-in is invalid and confidential data is not passed to the plug-in.

SUMMARY

The plug-in is common to devices that have an authentication function that authenticates users and devices that do not have an authentication function that authenticates users. Therefore, in the case of Application Programming Interface (API) that allows the plug-in to be accessed from the outside, and the plug-in is installed on a device that does not have an authentication function that authenticates the user, the plug-in can be execute by a malicious person, the device can be operated. For example, the device may be restarted multiple times.

Aspects of non-limiting embodiments of the present disclosure relate to an information processing apparatus, an information processing system, a non-transitory computer readable medium storing an information processing program, and an information processing method that are capable of limiting the execution of plug-in to legitimate users even in a case of a device that does not have an authentication function of authenticating the user.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to receive target authorization information to be collated, from an execution request source of a plug-in that extends access from an outside, in a case of executing the plug-in, and perform a process of controlling availability of execution of the plug-in, by using unique predetermined authorization information owned by the plug-in and the target authorization information.

BRIEF DESCRIPTION OF THE DRAWINGS

Exemplary embodiment(s) of the present invention will be described in detail based on the following figures, wherein.

DETAILED DESCRIPTION

First Exemplary Embodiment

Figure 1:
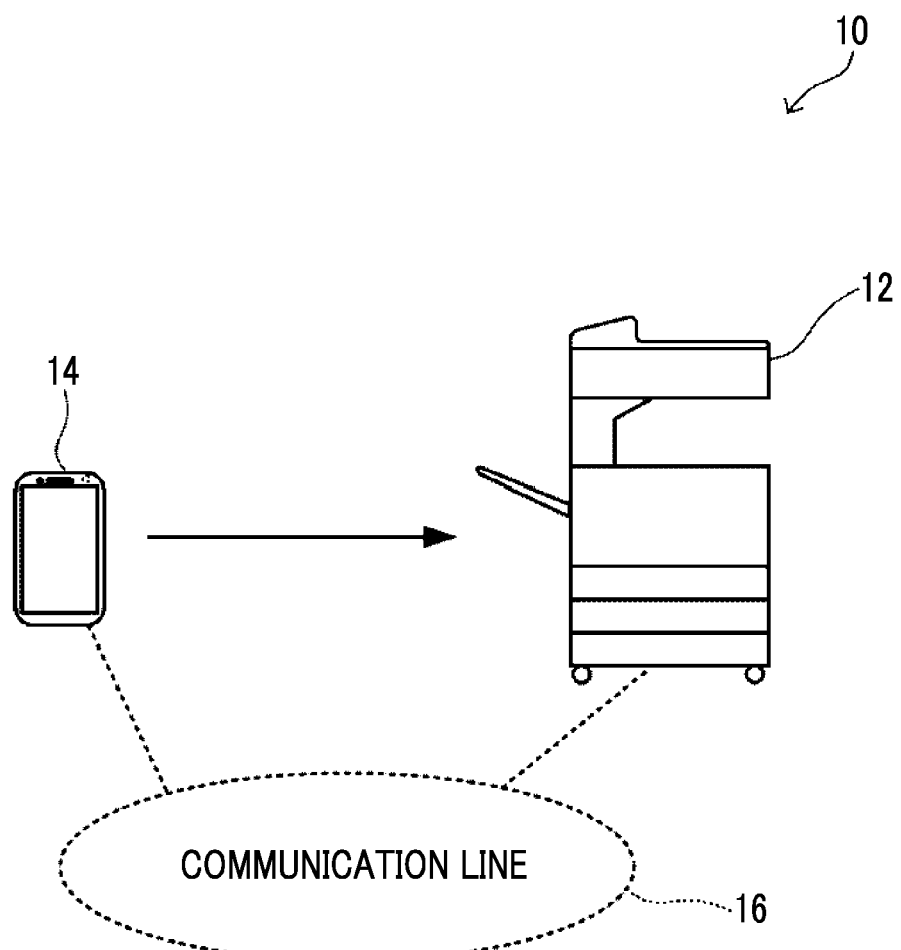
FIG. 1 is a diagram showing a schematic configuration of an information processing system according to a first exemplary embodiment.

Hereinafter, an example of the exemplary embodiment of the present invention will be described in detail with reference to the drawings. FIG. 1 is a diagram illustrating the schematic configuration of an information processing system according to the present exemplary embodiment.

An information processing system 10 according to the present exemplary embodiment includes an image forming apparatus 12 as an example of the information processing apparatus, and a mobile terminal apparatus 14.

The mobile terminal apparatus 14 can communicate with the image forming apparatus 12 by short-range communication, and the image forming apparatus 12 can be operated from the mobile terminal apparatus 14. For example, as the mobile terminal apparatus 14, a tablet terminal, a smartphone, or the like is applied as an example. Further, as short-range communication, Wi-Fi (registered trademark), Bluetooth (registered trademark) and the like are applied as examples.

For the image forming apparatus 12, an image forming apparatus having a plurality of functions such as a facsimile function, an image scan function, an image forming function, a copying function, a storage function for storing image information or the like, and a transmission function for transmitting image information or the like is applied as an example. Further, although one image forming apparatus 12 is shown in FIG. 1, the number of the image forming apparatuses 12 is not limited to one, and may be two or more. Further, although one mobile terminal apparatus 14 is shown in FIG. 1, the number of the mobile terminal apparatuses 14 is not limited to one, and may be two or more, and the possessed by each user may be applied.

Further, the communication between the mobile terminal apparatus 14 and the image forming apparatus 12 is described as short-range communication, but as shown by the dotted line in FIG. 1, communication may be performed via a wireless base station of a mobile phone network or the like or the communication line 16 of various networks (for example, LAN, WAN, Ethernet (registered trademark), or the like).

Figure 2:
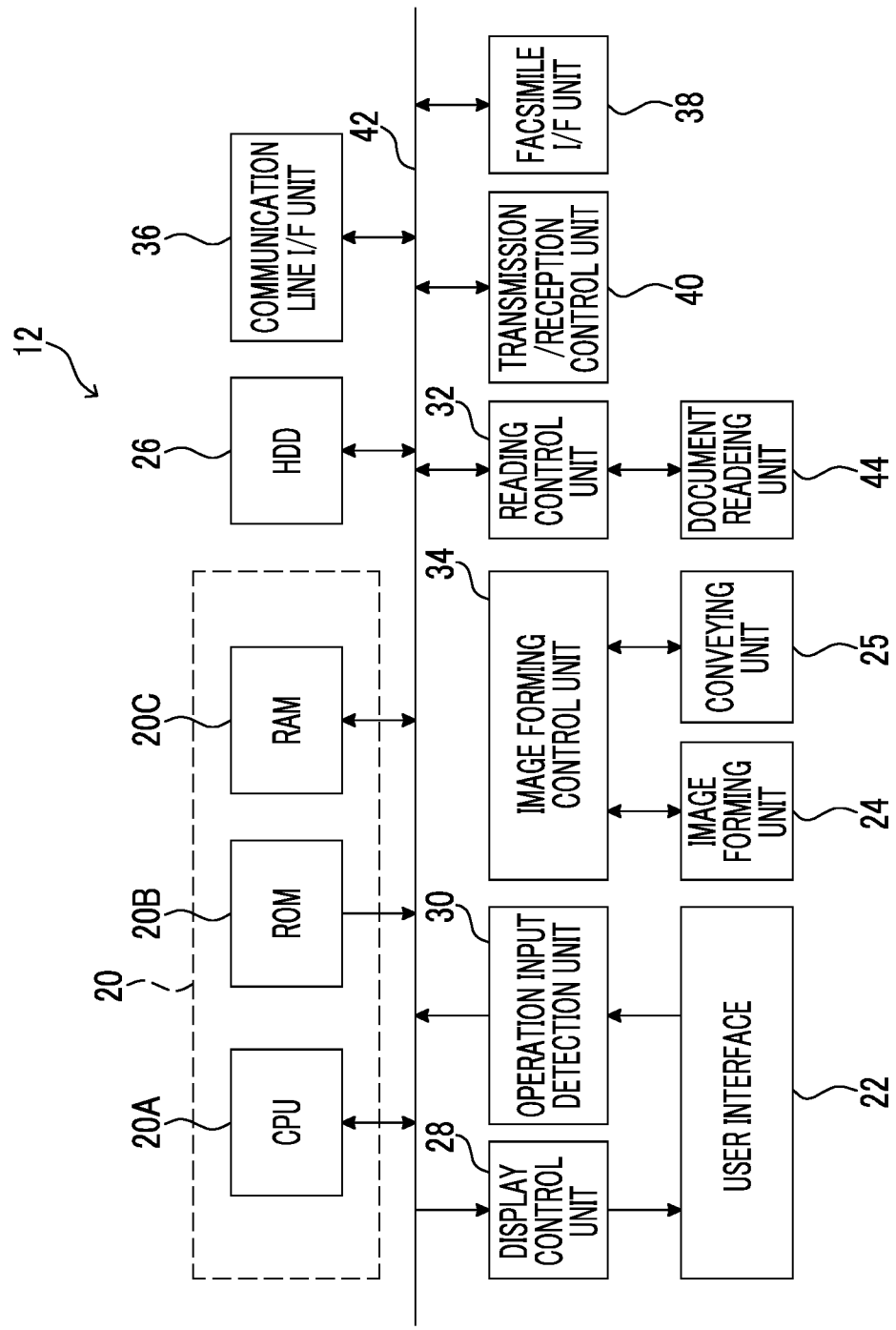
FIG. 2 is a block diagram showing a configuration of an electrical system of an image forming apparatus in the information processing system according to the first exemplary embodiment.

FIG. 2 is a block diagram showing a main configuration of an electrical system of an image forming apparatus 12 in the information processing system 10 according to the present exemplary embodiment.

As shown in FIG. 2, the image forming apparatus 12 according to the present exemplary embodiment includes a control unit 20 including a central processing unit (CPU) 20A, a read only memory (ROM) 20B, and a random access memory (RAM) 20C. The CPU 20A controls the overall operation of the image forming apparatus 12. The RAM 20C is used as a work area or the like when executing various programs by the CPU 20A. Various control programs, various parameters, and the like are stored in advance in the ROM 20B. The image forming apparatus 12 is electrically connected to each part of the control unit 20 via the system bus 42.

On the other hand, the image forming apparatus 12 according to the present exemplary embodiment includes a hard disk drive (HDD) 26 for storing various data, application programs, and the like. Further, the image forming apparatus 12 includes a display control unit 28 that is connected to the user interface 22 and controls the display of various operation screens and the like on the display of the user interface 22. Further, the image forming apparatus 12 includes an operation input detection unit 30 that is connected to the user interface 22 and detects an operation instruction input via the user interface 22. In the image forming apparatus 12, the HDD 26, the display control unit 28, and the operation input detection unit 30 are electrically connected to the system bus 42. In the image forming apparatus 12 according to the present exemplary embodiment, the HDD 26 is applied as the storage unit, but the present invention is not limited to this, and a non-volatile storage unit such as a flash memory may be applied.

Further, the image forming apparatus 12 according to the present exemplary embodiment includes a scan control unit 32 that controls an optical image scan operation by the document scan unit 44 and a document feeding operation by the document conveying unit, and an image forming control unit 34 that controls an image forming process by the image forming unit 24, and conveying of paper to the image forming unit 24 by the conveying unit 25. Further, the image forming apparatus 12 includes a communication line interface (I/F) unit 36 that transmits and receives communication data to and from another external apparatus connected to the communication lines 16 of various networks, and transmits and receives communication data to and from the mobile terminal apparatus 14 by short-range communication. Further, the image forming apparatus 12 includes a facsimile interface (I/F) unit 38 that is connected to a telephone line (not shown) and transmits and receives facsimile data to and from the facsimile apparatus connected to the telephone line. Further, the image forming apparatus 12 includes a transmission and reception control unit 40 that controls transmission and reception of facsimile data via the facsimile I/F unit 38. Then, in the image forming apparatus 12, the transmission and reception control unit 40, the scan control unit 32, the image forming control unit 34, the communication line I/F unit 36, and the facsimile I/F unit 38 are electrically connected to the system bus 42.

With the above configuration, the image forming apparatus 12 according to the present exemplary embodiment accesses the RAM 20C, the ROM 20B, and the HDD 26 by the CPU 20A, respectively. Further, the image forming apparatus 12 controls the display of information such as an operation screen and various messages on the display 22A of the user interface 22 via the display control unit 28, by the CPU 20A. Further, the image forming apparatus 12 controls the operations of the document scan unit 44 and the document conveying unit via the scan control unit 32, by the CPU 20A. Further, the image forming apparatus 12 controls the operations of the image forming unit 24 and the conveying unit 25 via the image forming control unit 34 and controls the transmission and reception of communication data via the communication line I/F unit 36, by the CPU 20A, respectively. Further, the image forming apparatus 12 controls the transmission and reception of facsimile data via the facsimile I/F unit 38 by the transmission and reception control unit 40, by the CPU 20A. Further, the image forming apparatus 12 grasps the operation contents in the user interface 22 based on the operation information detected by the operation input detection unit 30, and executes various controls based on the operation contents, by the CPU 20A.

Figure 3:
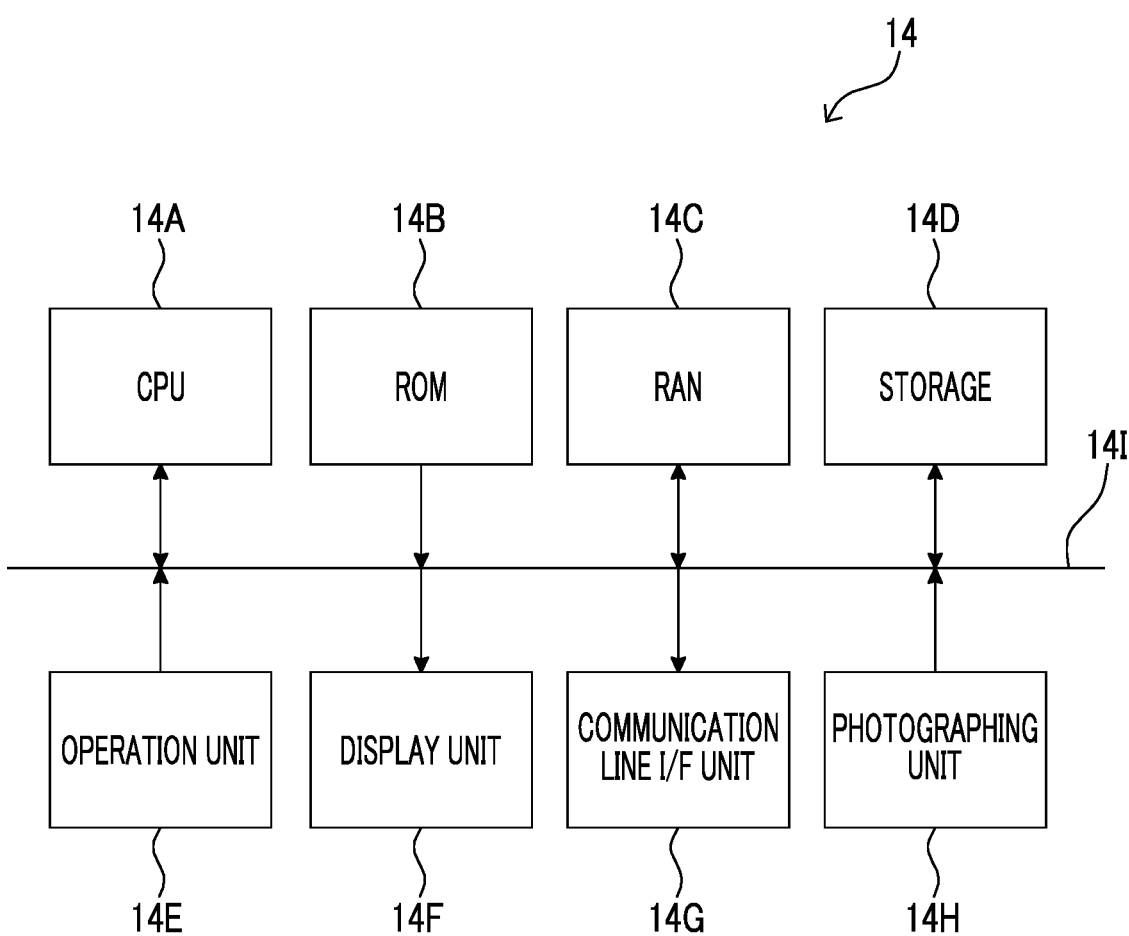
FIG. 3 is a block diagram showing a configuration of an electrical system of a mobile terminal apparatus in the information processing system according to the first exemplary embodiment.

Subsequently, the main configuration of an electrical system of the mobile terminal apparatus 14 according to the present exemplary embodiment will be described. FIG. 3 is a block diagram showing a main configuration of an electrical system of the mobile terminal apparatus 14 in the information processing system 10 according to the present exemplary embodiment.

As shown in FIG. 3, the mobile terminal apparatus 14 according to the present exemplary embodiment includes a CPU 14A as an example of a processor, a ROM 14B, a RAM 14C, a storage 14D, an operation unit 14E, a display unit 14F, a communication line interface (I/F) unit 14G, and a photographing unit 14H. The CPU 14A controls the overall operation of the mobile terminal apparatus 14. Various control programs, various parameters, and the like are stored in advance in the ROM 14B. The RAM 14C is used as a work area or the like when executing various programs by the CPU 14A. Various data, application programs, and the like are stored in the storage 14D. The operation unit 14E is used to input various types of information. The display unit 14F is used to display various types of information. The photographing unit 14H outputs the image information obtained by photographing. The communication line I/F unit 14G transmits and receives various data to and from other apparatuses connected to communication lines such as various networks. Further, the communication line I/F unit 14G uses various well-known wireless communications to transmit and receive various data to and from the mobile terminal apparatus 14. Each part of the mobile terminal apparatus 14 is electrically connected to each other via the system bus 141. In the mobile terminal apparatus 14 according to the present exemplary embodiment, the storage 14D is applied as a storage unit, but various non-volatile storage units such as a hard disk drive (HDD) and a flash memory are applied as an example, for the storage 14D.

With the above configuration, the mobile terminal apparatus 14 according to the present exemplary embodiment accesses the ROM 14B, the RAM 14C, and the storage 14D by the CPU 14A, acquires various data by the operation unit 14E, performs photographing by the photographing unit 14H, and displays various types of information on the display unit 14F, respectively. Further, the mobile terminal apparatus 14 controls the transmission and reception of communication data via the communication line I/F unit 14G, by the CPU 14A.

Figure 4:
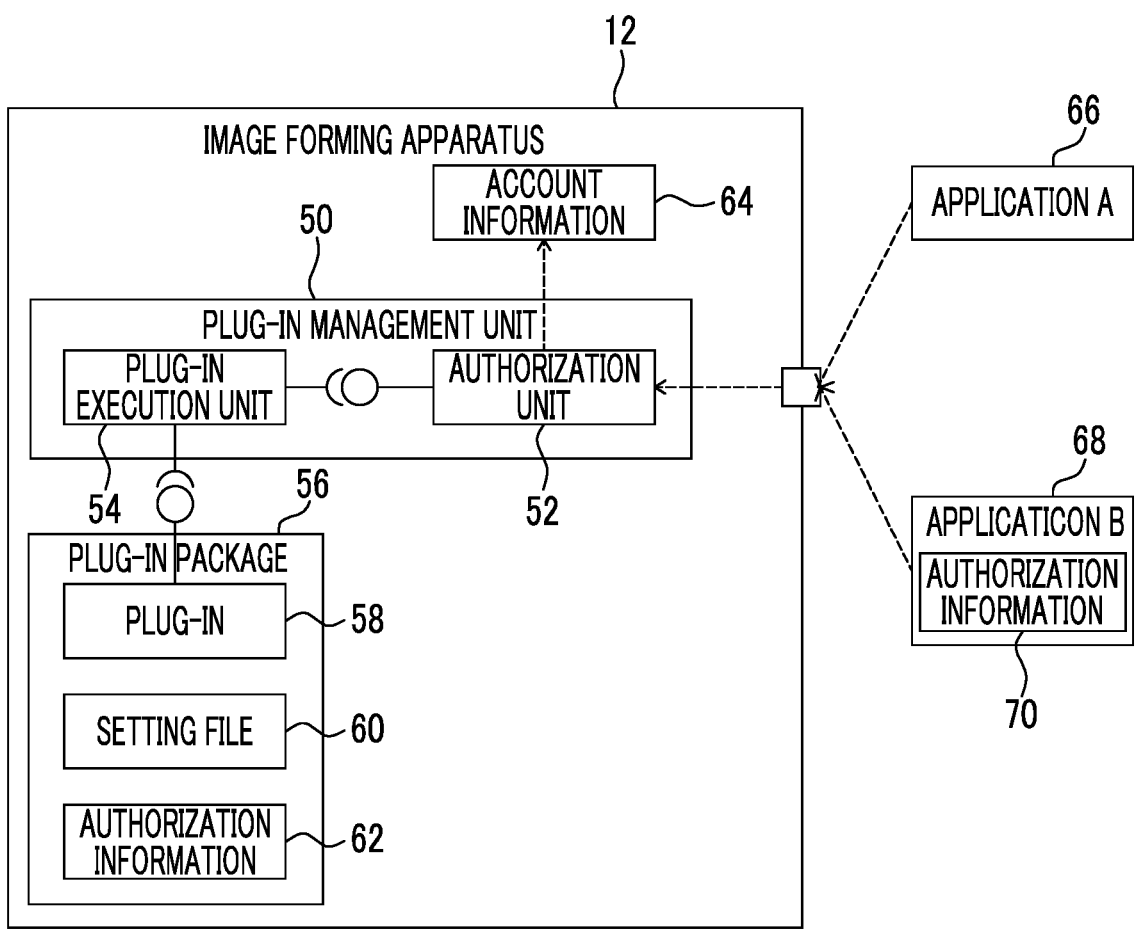
FIG. 4 is a functional block diagram showing a functional configuration of a control unit of the image forming apparatus according to the first exemplary embodiment.

Subsequently, the functional configuration of the control unit 20 of the image forming apparatus 12 will be described. FIG. 4 is a functional block diagram showing a functional configuration of a control unit 20 of the image forming apparatus 12 according to the present exemplary embodiment.

The control unit 20 has the function of the plug-in management unit 50 by the CPU 20A executing the program stored in the ROM 20B.

The plug-in management unit 50 has the functions of the authorization unit 52 and the plug-in execution unit 54 as functions for managing the plug-in 58 installed in the image forming apparatus 12.

The authorization unit 52 authorizes the execution request of the plug-in 58 from the outside by using the account information 64. Further, in a case of executing the plug-in 58 that extends access from the outside, the authorization unit 52 receives the authorization information 70 as the target authorization information to be collated from the execution request source of the plug-in 58, and determines availability of execution of the plug-in, by using unique predetermined authorization information 62 owned by the plug-in 58 and the received authorization information 70. As an example, in a case where the image forming apparatus 12 has an authentication function for authenticating the user, the account information 64 is used for authentication, and in a case where the image forming apparatus 12 does not have the authentication function for authenticating the user, the authorization information 62 unique to the plug-in 58 and the authorization information acquired from the execution request source of the external plug-in 58 are used to determine whether or not the user is a legitimate user, and the execution request of the plug-in 58 is authorized.

The plug-in execution unit 54 controls the execution of the plug-in 58 installed as the plug-in package 56, according to the authorization result of the authorization unit 52.

The plug-in package 56 includes a plug-in 58, a setting file 60 as an example of a setting function, and authorization information 62, and is installed in the image forming apparatus 12 by an administrator or the like of the image forming apparatus 12.

In the present exemplary embodiment, the plug-in 58 has a function of extending access from the outside of the image forming apparatus 12. By executing the plug-in 58 from the outside, it is possible to execute a predetermined function of the image forming apparatus 12.

The setting file 60 is a file in which the settings related to the execution of the plug-in 58 are stored. For example, it is possible to set whether to prioritize the authorization based on the account information or the authorization based on the authorization information. In the present exemplary embodiment, it is assumed that the plug-in is installed in a state where the setting file 60 is set for each plug-in, but the setting contents of the setting file 60 may be changed after the installation. The plug-in package 56 may have a configuration in which the setting file 60 is omitted, that is, a configuration including the plug-in 58 and the authorization information 62.

The authorization information is information unique to the plug-in 58, and for example, a predetermined number of character strings including numbers, symbols, and the like are applied.

In the present exemplary embodiment, in a case where the application A 66 having no authorization information 70 requests the image forming apparatus 12 to execute the plug-in 58, the authorization unit 52 determines that the user is not a legitimate user, and the plug-in execution unit 54 performs control so as to prohibit the execution of the plug-in 58.

On the other hand, in a case where the application B68 having the authorization information 70 requests the image forming apparatus 12 to execute the plug-in 58, the authorization unit 52 collates the authorization information 62 of the plug-in package 56 and the authorization information 70 of the application B68. Then, in a case where the authorization information 70 of the application B68 matches the authorization information 62, the execution request of the plug-in 58 is authorized, and the plug-in execution unit 54 performs control to execute the plug-in 58. In a case where the authorization information 70 of the application B68 corresponds to the authorization information 62, the execution request of the plug-in 58 may be authorized.

The present exemplary embodiment has been described that the authorization information 70 is stored in the application B68, but the authorization information 70 may be input by the user via the operation unit 14E of the mobile terminal apparatus 14.

Subsequently, a specific process performed in each part of the information processing system 10 according to the present exemplary embodiment will be described.

As a preliminary preparation for performing a process in each part of the information processing system 10, the administrator installs the plug-in package 56 in advance on the image forming apparatus 12. For example, the ID of the plug-in 58 is set to 10000000. Further, the user installs the application on the mobile terminal apparatus 14, and the user registers the account information 64 in the image forming apparatus 12.

Figure 5:
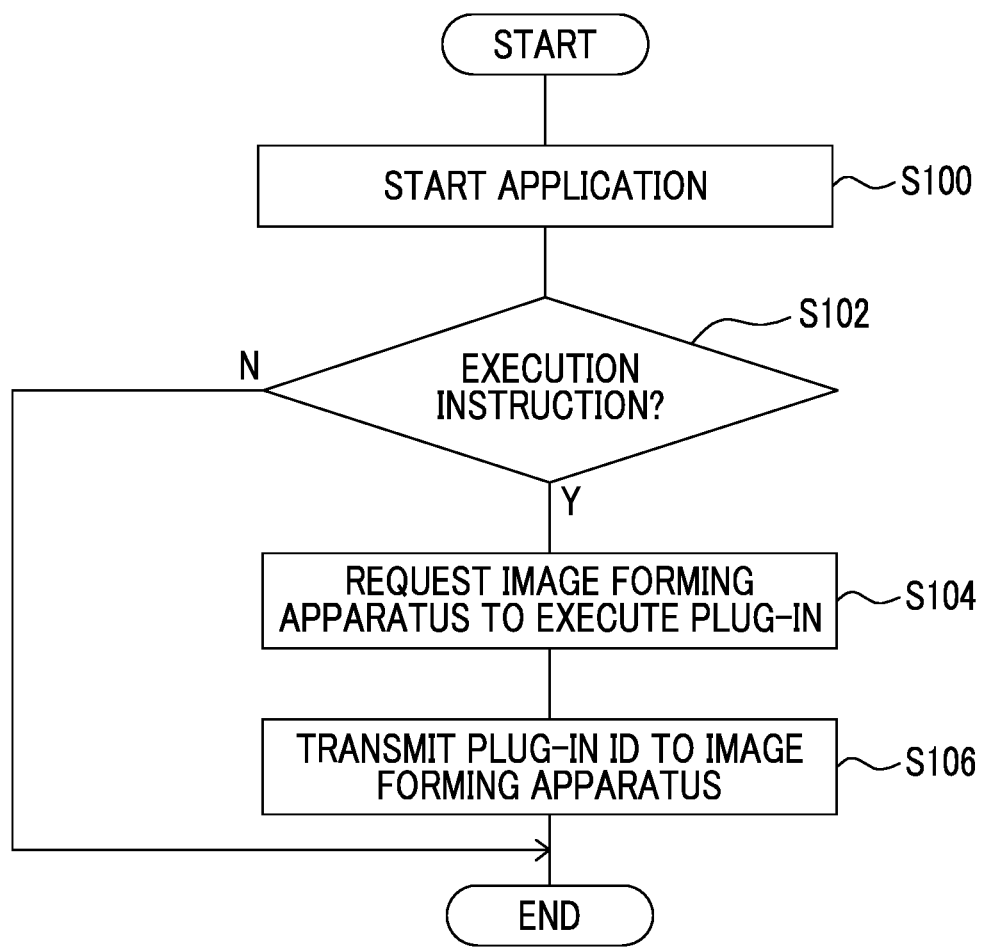
FIG. 5 is a flowchart showing an example of a processing flow in a case where an application is operated to request the image forming apparatus to execute a plug-in, in the mobile terminal apparatus of the information processing system according to the first exemplary embodiment.

First, after the preliminary preparation, the process of operating the application of the mobile terminal apparatus 14 to request the image forming apparatus 12 to execute the plug-in 58 will be described. FIG. 5 is a flowchart showing an example of a processing flow in a case where an application is operated to request the image forming apparatus 12 to execute a plug-in 58, in the mobile terminal apparatus 14 of the information processing system according to the present exemplary embodiment. The process of FIG. 5 starts, for example, in a case where the start of the application of the mobile terminal apparatus 14 is instructed.

In step S100, the CPU 14A starts the application instructed by the user and proceeds to step S102.

In step S102, the CPU 14A determines whether or not the execution of the plug-in 58 is instructed. For example, it is determined whether or not an operation of a copy job execution button of the application has been performed. In a case where the determination is denied, the process is terminated and another process is performed. On the other hand, in a case where the determination is affirmed, the process proceeds to step S104.

In step S104, the CPU 14A requests the image forming apparatus 12 to execute the plug-in, and proceeds to step S106. In the present exemplary embodiment, step S104 is performed in a case where the user approaches the image forming apparatus 12 and short-range communication is established, but in a case where short-range communication is not established, communication may be established via the communication line 16.

In step S106, the CPU 14A ends the process of transmitting the plug-in ID to the image forming apparatus 12 and requesting the execution of the plug-in 58. For example, the execution instruction of the plug-in of a plug-in ID: 10000000 is transmitted.

Figure 6:
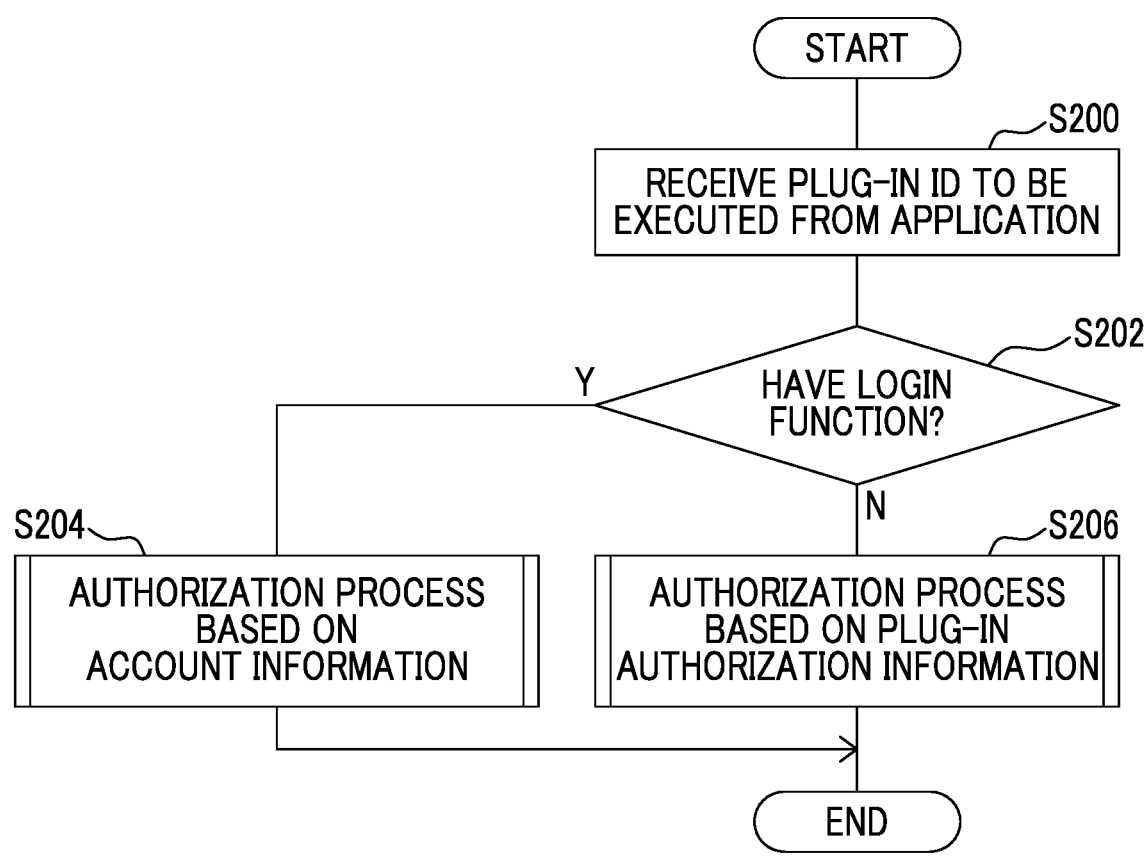
FIG. 6 is a flowchart showing an example of a flow of process performed by an image forming apparatus, in a case where an execution request of the plug-in is made from a mobile terminal apparatus, in the information processing system according to the first exemplary embodiment.

Subsequently, the process performed by the image forming apparatus 12 in a case where the execution request of the plug-in is made from the mobile terminal apparatus 14 will be described. FIG. 6 is a flowchart showing an example of a flow of process performed by an image forming apparatus 12, in a case where an execution request of the plug-in is made from a mobile terminal apparatus 14, in the information processing system 10 according to the present exemplary embodiment. Further, the process of FIG. 6 starts in a case where the plug-in ID is transmitted from the mobile terminal apparatus 14 to the image forming apparatus 12 in step S106 described above.

In step S200, the CPU 20A receives the plug-in ID to be executed from the application and proceeds to step S202. That is, the plug-in ID transmitted from the mobile terminal apparatus 14 in step S106 described above is received.

In step S202, the CPU 20A determines whether or not the image forming apparatus 12 has an authentication function for authenticating a user by a login function. In a case where the determination is affirmed, the process proceeds to step S204, and in a case where the determination is denied, the process proceeds to step S206.

In step S204, the CPU 20A performs an authorization process based on the account information 64 and ends a series of processes. The details of the authorization process based on the account information 64 will be described later.

On the other hand, in step S206, the CPU 20A performs an authorization process based on the plug-in authorization information and ends a series of processes. The details of the authorization process based on the plug-in authorization information will be described later.

Figure 7:
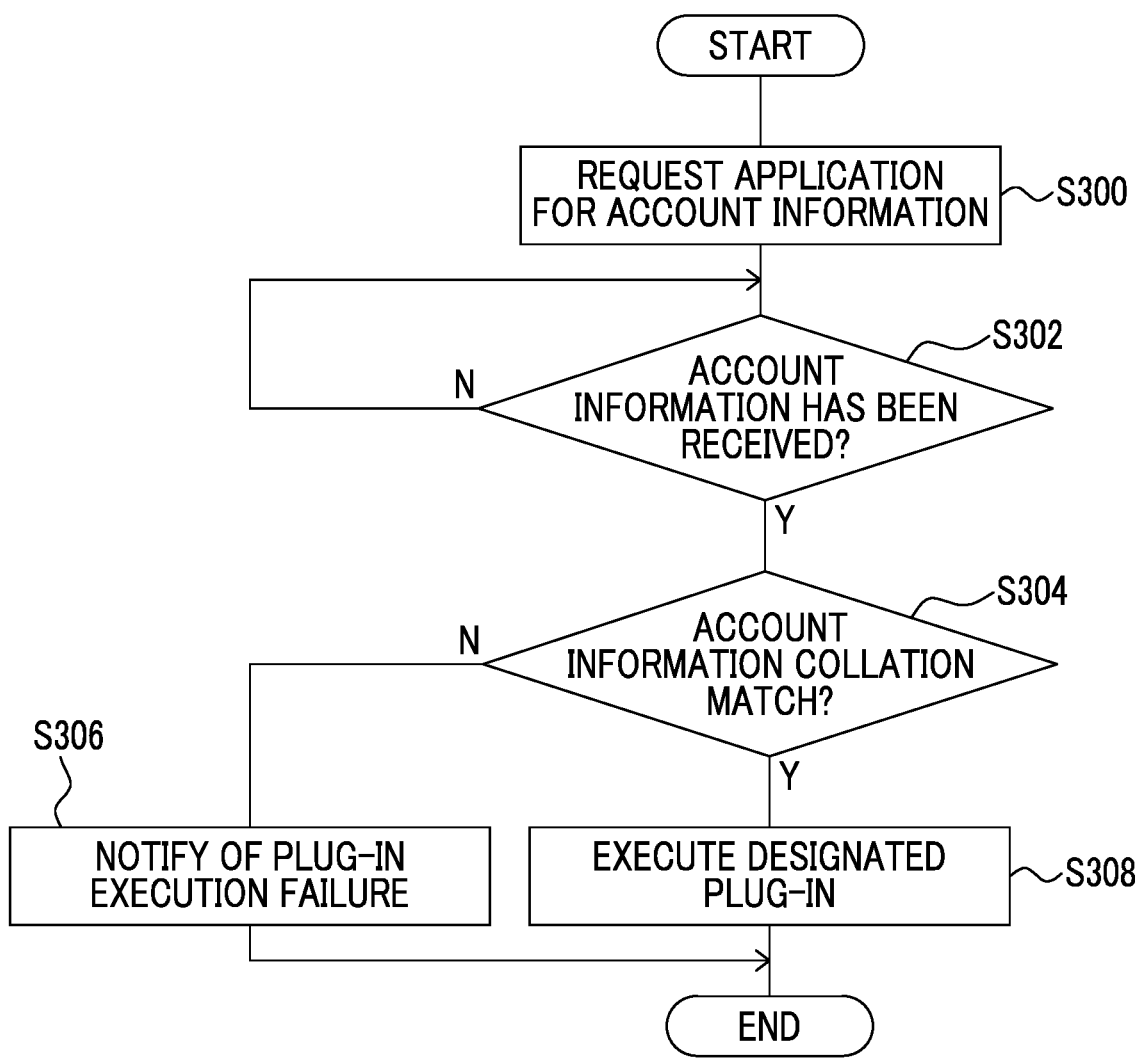
FIG. 7 is a flowchart showing an example of a flow of an authorization process based on account information.

Here, the details of the authorization process based on the account information in step S204 described above will be described. FIG. 7 is a flowchart showing an example of a flow of an authorization process based on account information.

In step S300, the CPU 20A requests the application of the mobile terminal apparatus 14 for account information, and proceeds to step S302.

In step S302, the CPU 20A determines whether or not the account information has been received from the mobile terminal apparatus 14. The process proceeds to step S304 after waiting until the determination is affirmed. In a case where a cancel operation or the like is performed from the mobile terminal apparatus 14 during standby, the process is terminated, and in a case where another operation is instructed, the process is terminated and the process proceeds to another process.

In step S304, the CPU 20A determines whether or not account information pieces match. That is, the account information stored in the image forming apparatus 12 is collated with the account information received from the mobile terminal apparatus 14, and it is determined whether or not the execution of the plug-in 58 is authorized. In a case where the determination is denied, the process proceeds to step S306, and in a case where the determination is affirmed, the process proceeds to step S308.

In step S306, the CPU 20A notifies the user of the plug-in execution failure and ends the series of processes. For example, by notifying the mobile terminal apparatus 14 of the plug-in execution failure, the user is notified by displaying on the display unit 14F of the mobile terminal apparatus 14 that the plug-in 58 cannot be executed.

On the other hand, in step S308, the CPU 20A executes the designated plug-in and ends a series of processes.

Figure 8:
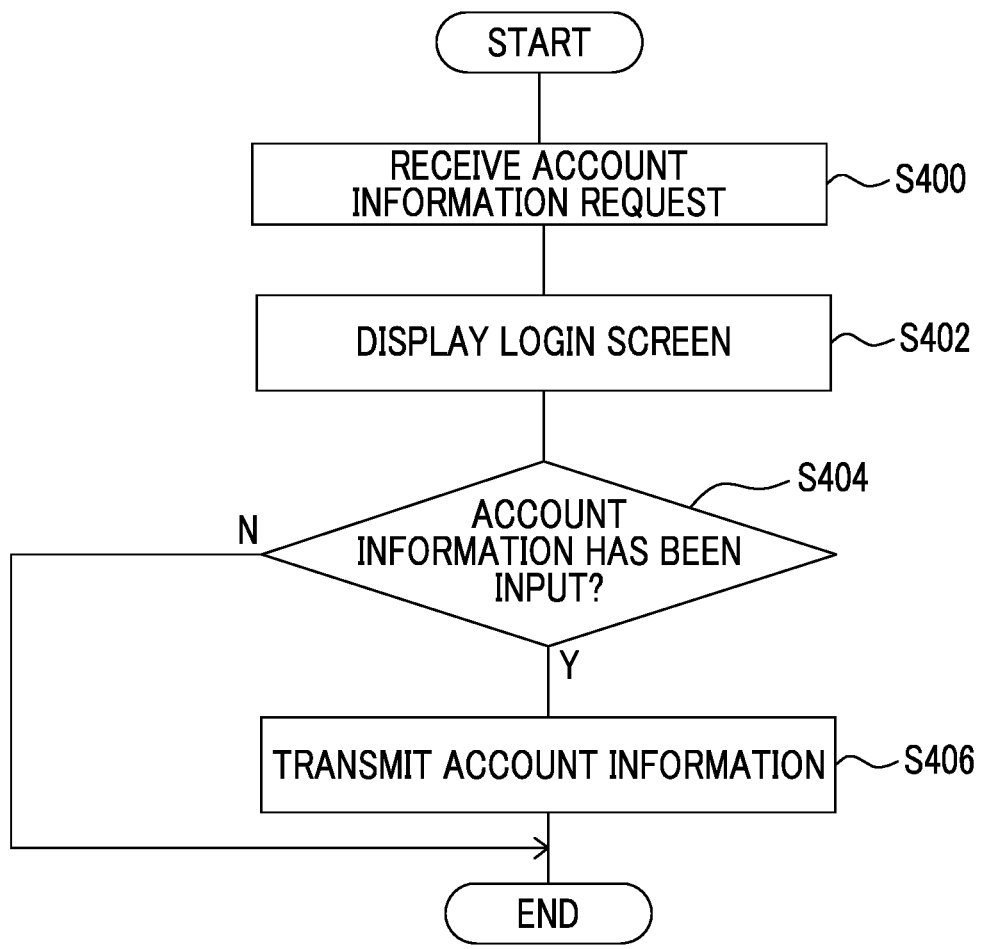
FIG. 8 is a flowchart showing an example of a flow of process performed by the mobile terminal apparatus in response to the authorization process based on the account information performed by the image forming apparatus, in the information processing system according to the first exemplary embodiment.

Next, the process performed by the mobile terminal apparatus 14 in response to the authorization process based on the account information performed by the image forming apparatus 12 will be described. FIG. 8 is a flowchart showing an example of a flow of process performed by the mobile terminal apparatus 14 in response to the authorization process based on the account information performed by the image forming apparatus 12, in the information processing system 10 according to the present exemplary embodiment. Further, the process of FIG. 8 starts in a case where the account information is requested from the image forming apparatus 12 in step S300 described above.

In step S400, the CPU 14A receives the account information request, transmitted from the image forming apparatus 12, and proceeds to step S402.

In step S402, the CPU 14A displays a predetermined login screen for authenticating the user on the display unit 14F, and proceeds to step S404.

In step S404, the CPU 14A operates the operation unit 14E on the login screen to determine whether or not the account information has been input. In a case where the account information is not input and other operations such as cancellation are performed, the series of processes is terminated. On the other hand, in a case where the determination as to whether or not the account information has been input is affirmed, the process proceeds to step S406.

In step S406, the CPU 14A transmits the input account information to the image forming apparatus 12 that is the request source, and ends a series of processes.

Figure 9:
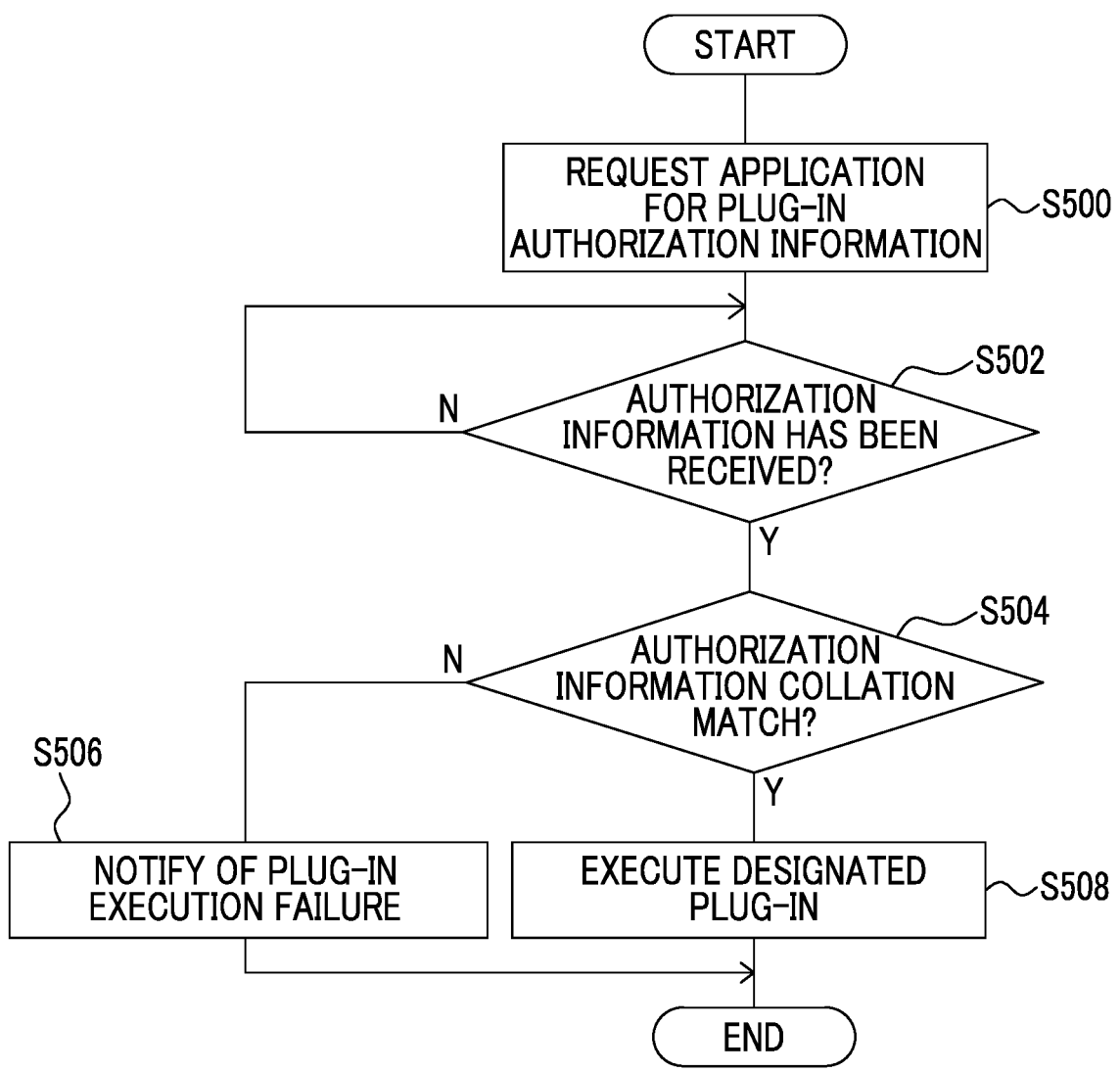
FIG. 9 is a flowchart showing an example of a flow of an authorization process based on plug-in authorization.

Subsequently, the details of the authorization process based on the above-described plug-in authorization information will be described. FIG. 9 is a flowchart showing an example of a flow of an authorization process based on plug-in authorization.

In step S500, the CPU 20A requests the application of the mobile terminal apparatus 14 for the plug-in authorization information, and proceeds to step S502.

In step S502, the CPU 20A determines whether or not the authorization information has been received from the mobile terminal apparatus 14. The process proceeds to step S504 after waiting until the determination is affirmed. In a case the authorization information is not received even after the lapse of a predetermined time, the process may be terminated.

In step S504, the CPU 20A determines whether or not the authorization information 62 in the plug-in package 56 and the authorization information 70 received from the mobile terminal apparatus 14 match. That is, whether or not the plug-in 58 is executable is controlled by collating the authorization information 62 of the plug-in 58 with the authorization information 70 of the application of the mobile terminal apparatus 14. In a case where the determination is denied, the process proceeds to step S506, and in a case where the determination is affirmed, the process proceeds to step S508.

In step S506, the CPU 20A notifies the user of the plug-in execution failure and ends a series of processes. For example, by notifying the mobile terminal apparatus 14 of the plug-in execution failure, the user is notified by displaying on the display unit 14F of the mobile terminal apparatus 14 that the plug-in cannot be executed.

On the other hand, in step S508, the CPU 20A executes the designated plug-in and ends a series of processes.

Figure 10:
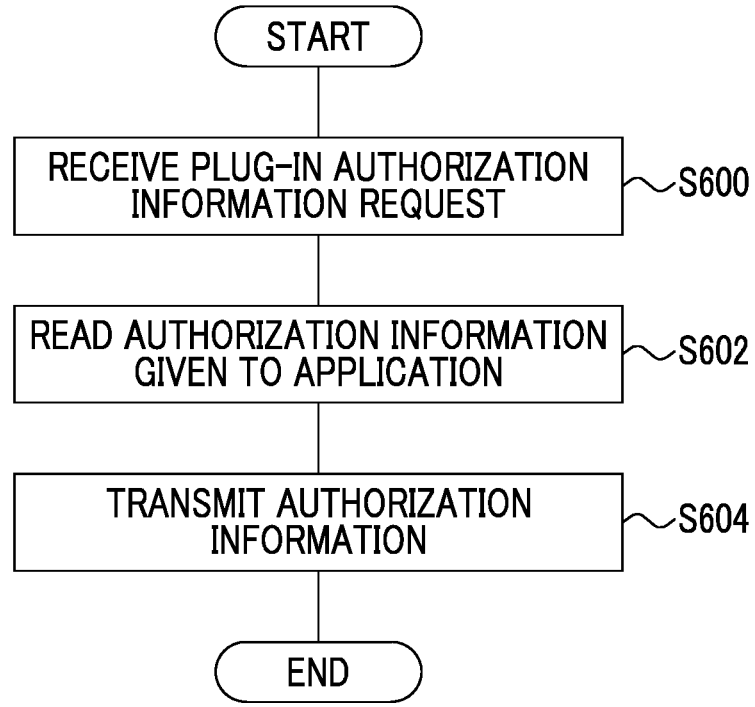
FIG. 10 is a flowchart showing an example of a flow of process performed by the mobile terminal apparatus in response to the authorization process based on the plug-in authorization information performed by the image forming apparatus, in the information processing system according to the first exemplary embodiment.

Next, the process performed by the mobile terminal apparatus 14 in response to the authorization process based on the plug-in authorization information performed by the image forming apparatus 12 will be described. FIG. 10 is a flowchart showing an example of a flow of process performed by the mobile terminal apparatus 14 in response to the authorization process based on the plug-in authorization information performed by the image forming apparatus 12, in the information processing system 10 according to the present exemplary embodiment. Further, the process of FIG. 10 starts in a case where the plug-in authorization information is requested from the image forming apparatus 12 in step S500 described above.

In step S600, the CPU 14A receives the plug-in authorization information request transmitted from the image forming apparatus 12, and proceeds to step S602.

In step S602, the CPU 14A reads the authorization information 70 given to the application and proceeds to step S604. Here, in a case where there is no authorization information 70, the process ends and the plug-in cannot be executed.

In step S606, the CPU 14A transmits the read authorization information 70 to the image forming apparatus 12, and ends a series of processes.

Incidentally, in the present exemplary embodiment, by providing the setting file 60 in the plug-in package 56, it is possible to set individually whether to perform the authorization based on the user account information or the authorization based on the plug-in authorization information, even in the image forming apparatus 12 having an authentication function for authenticating the user.

For example, by setting whether to prioritize in the setting file 60, the setting file is read and processing is performed according to the setting. Specifically, a plug-in authorization priority flag is provided in the setting file 60, and the image forming apparatus 12 performs processing according to the plug-in authorization priority flag. That is, in a case where the plug-in authorization priority flag is set, authorization based on the plug-in authorization information is performed, and in a case where the plug-in authorization priority flag is not set, authorization based on the user account information is performed.

The setting file 60 may be set for each plug-in package so that the setting cannot be changed, or may be in a form in which the setting can be changed after installation in the image forming apparatus 12.

Figure 11:
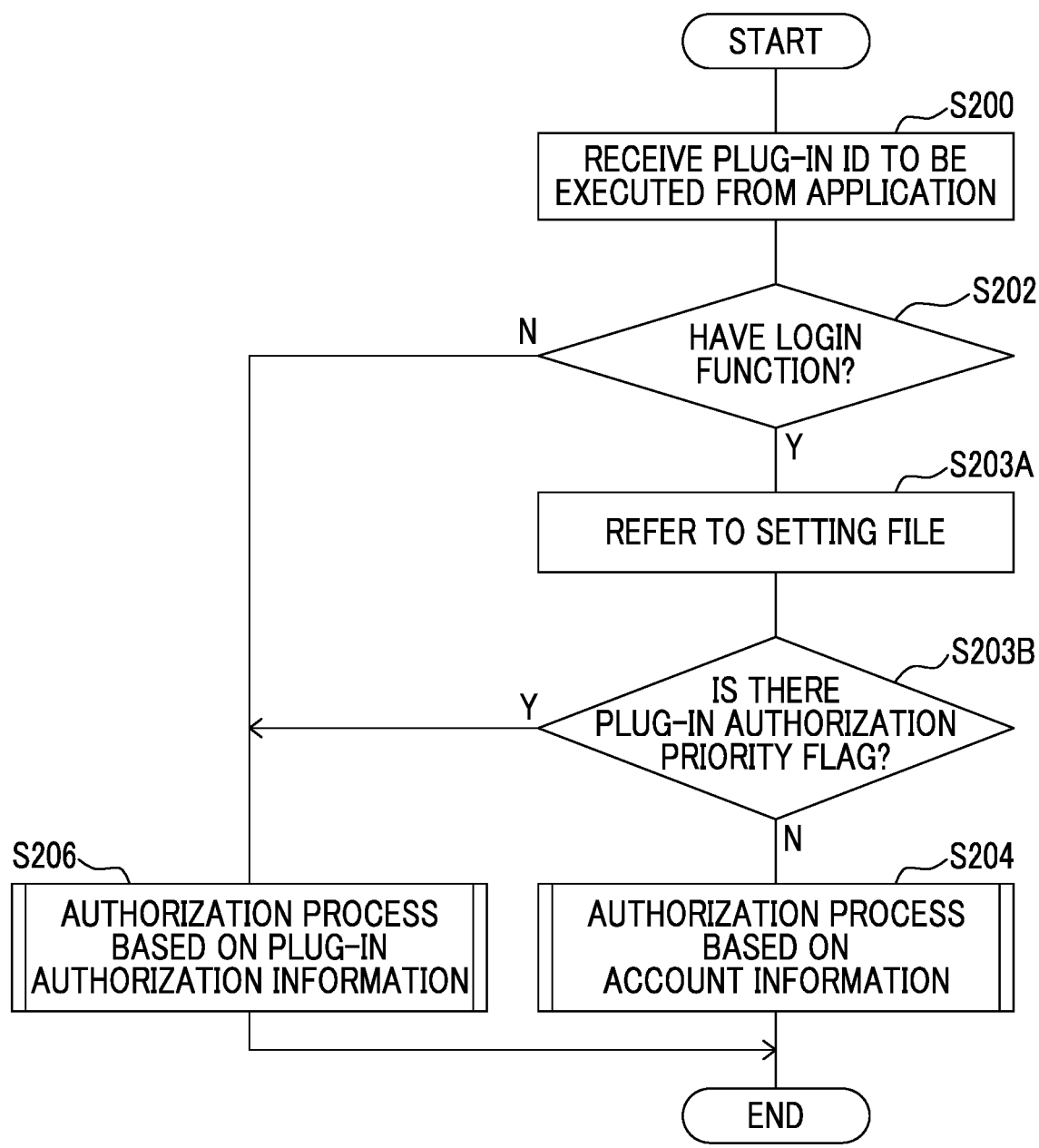
FIG. 11 is a flowchart showing a first modification example of a flow of process performed by an image forming apparatus, in a case where an execution request of the plug-in is made from a mobile terminal apparatus, in the information processing system according to the first exemplary embodiment.

Here, the process in a case where the image forming apparatus 12 performs the process with reference to the setting file 60 will be described. FIG. 11 is a flowchart showing a first modification example of a flow of process performed by the image forming apparatus 12, in a case where the execution request of the plug-in 58 is made from the mobile terminal apparatus 14, in the information processing system 10 according to the present exemplary embodiment. The identical process to the process in FIG. 6 described above will be described with the identical reference numerals. Further, the process of FIG. 11 starts in a case where the process of FIG. 5 described above is performed and the plug-in ID is transmitted from the mobile terminal apparatus 14 to the image forming apparatus 12 in step S106 described above.

In step S200, the CPU 20A receives the plug-in ID to be executed from the application and proceeds to step S202. That is, the plug-in ID transmitted from the mobile terminal apparatus 14 in step S106 described above is received.

In step S202, the CPU 20A determines whether or not the image forming apparatus 12 has an authentication function for authenticating a user by a login function. In a case where the determination is denied, the process proceeds to step S206 described above, and in a case where the determination is affirmed, the process proceeds to step S203A.

In step S206, the CPU 20A performs an authorization process based on the plug-in authorization information and ends a series of processes. That is, the process shown in FIG. 9 described above is performed.

On the other hand, in step S203A, the CPU 20A proceeds to step S203B with reference to the setting file 60 of the plug-in package 56.

In step S203B, the CPU 20A determines whether or not there is a plug-in authorization priority flag. In the determination, for example, it is determined whether or not the plug-in authorization priority flag is set in the setting file 60. In a case where the determination is affirmed, the process proceeds to step S206 described above, and in a case where the determination is denied, the process proceeds to step S204 described above.

In step S204, the CPU 20A performs an authorization process based on the account information 64 and ends a series of processes. That is, the above-described process of FIG. 7 is performed.

Figure 12:
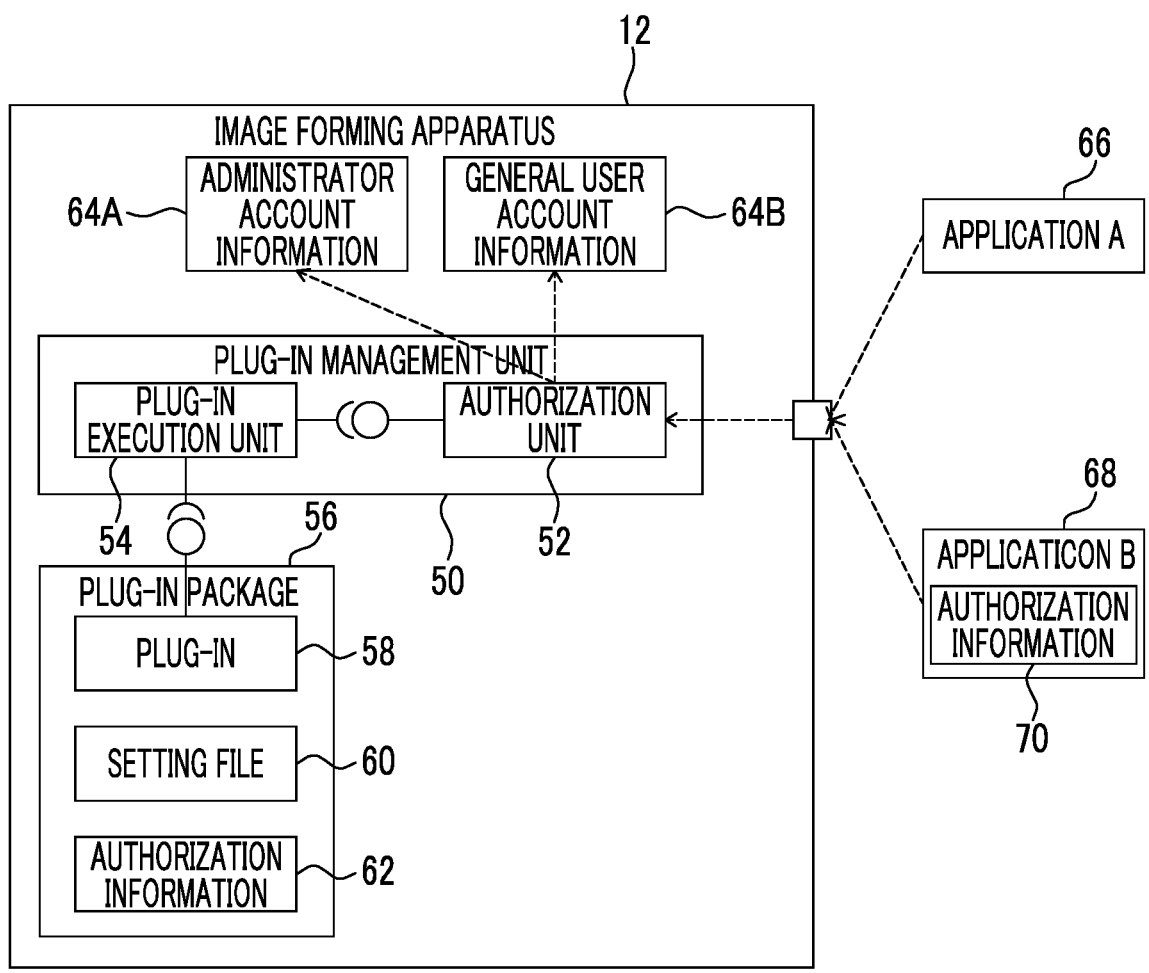
FIG. 12 is a diagram showing a configuration example in a case of setting whether to authorize a general user account or an administrator account, in a setting file for each plug-in, in an image forming apparatus having general user account information and administrator account information and capable of authentication based on the general user account and authentication based on the administrator account.

The setting file 60 may be set with settings other than making it possible to individually set whether to perform authorization based on account information 64 or authorization based on plug-in authorization information. For example, as shown in FIG. 12, in the image forming apparatus 12 provided with the administrator account information 64A and the general user account information 64B and capable of authentication based on the general user account and authentication based on the administrator account, whether to use a general user account or an administrator account for authorization may be set in the setting file 60 for each plug-in. FIG. 12 is a diagram showing a configuration example in a case of setting whether to authorize a general user account or an administrator account, in a setting file 60 for each plug-in, in the image forming apparatus 12 having administrator account information 64A and general user account information 64B and capable of authentication based on the general user account and authentication based on the administrator account. The identical configuration to the functional configuration of the control unit 20 of the image forming apparatus 12 of FIG. 4 will be described with the identical reference numerals.

Specifically, an administrator authentication flag is provided in the setting file 60 included in the plug-in package 56, and the image forming apparatus 12 performs processing according to the administrator authentication flag. That is, in a case where the administrator authentication flag is set, the administrator account is used to authorize the execution of the plug-in 58, and in a case where the administrator authentication flag is not set, the general user account is used to authorize the execution of the plug-in 58.

By using the authorization based on the administrator account, the security of plug-in execution becomes stronger. Security is stronger with authorization by authenticating only one administrator or fewer administrators than general users than authorization by authenticating multiple general users. By setting the setting file 60 such as whether to set a flag or not depending on the processing content of the plug-in, the plug-in creator can set whether to authorize the execution of the plug-in with the administrator account or the plug-in 58 with the general user account. For example, in the case of the plug-in 58 that performs a high-risk process that uses functions that handle personal information such as address book export and functions that are highly related to the printer business such as billing meter update, by setting a flag, the execution of the plug-in 58 is authorized by using the administrator account, and the security is strengthened.

Figure 13:
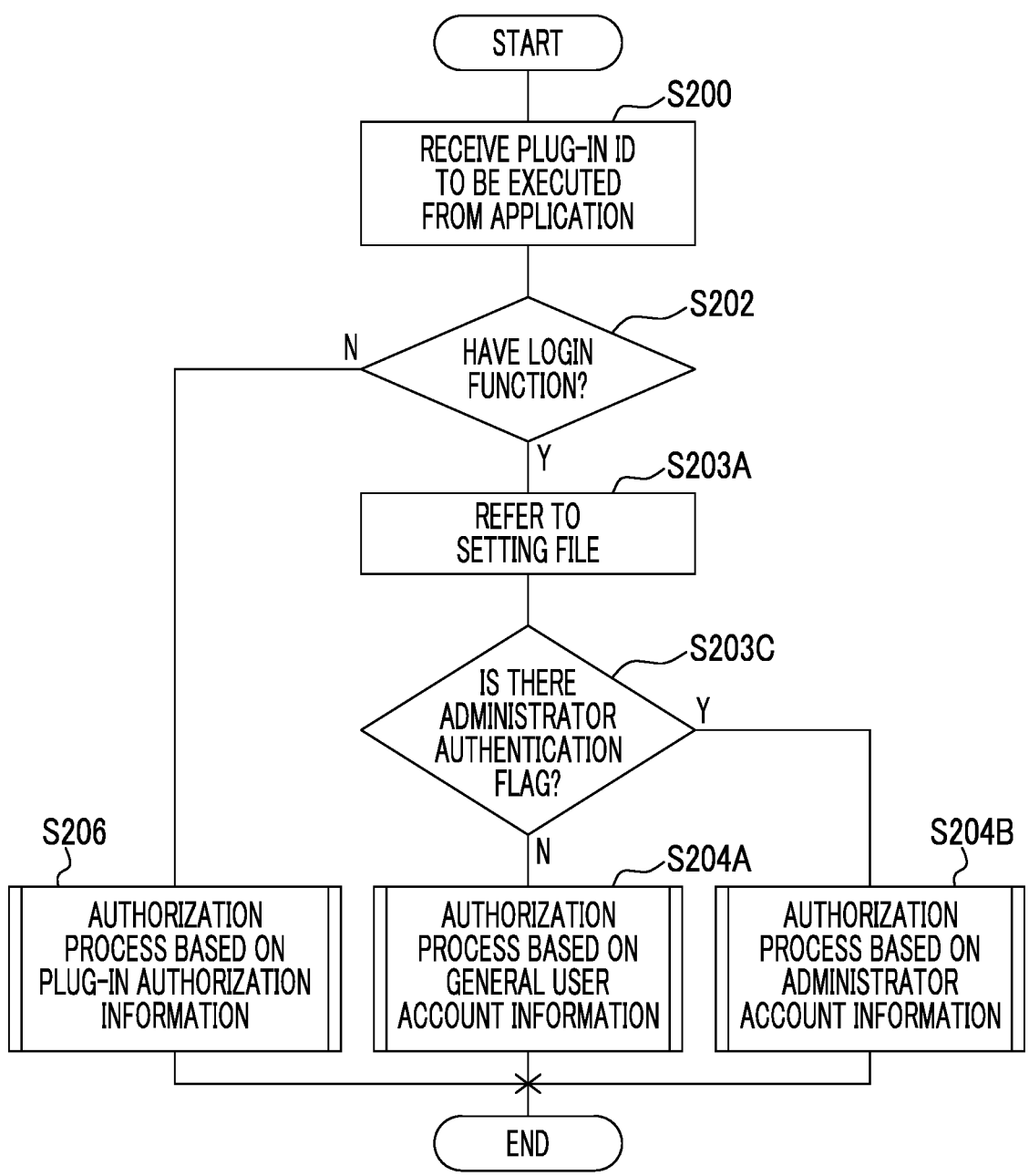
FIG. 13 is a flowchart showing a second modification example of a flow of process performed by an image forming apparatus, in a case where an execution request of the plug-in is made from a mobile terminal apparatus, in the information processing system according to the first exemplary embodiment.

Here, a specific process in a case where the administrator authentication flag is provided in the setting file 60 and the image forming apparatus 12 performs the process according to the administrator authentication flag will be described. FIG. 13 is a flowchart showing a second modification example of a flow of process performed by the image forming apparatus 12, in a case where the execution request of the plug-in 58 is made from the mobile terminal apparatus 14, in the information processing system 10 according to the present exemplary embodiment. The identical process to the process in FIG. 6 described above will be described with the identical reference numerals. Further, the process of FIG. 13 starts in a case where the process of FIG. 5 described above is performed and the plug-in ID is transmitted from the mobile terminal apparatus 14 to the image forming apparatus 12 in step S106 described above.

In step S200, the CPU 20A receives the plug-in ID to be executed from the application and proceeds to step S202. That is, the plug-in ID transmitted from the mobile terminal apparatus 14 in step S106 described above is received.

In step S202, the CPU 20A determines whether or not the image forming apparatus 12 has an authentication function for authenticating a user by a login function. In a case where the determination is denied, the process proceeds to step S206 described above, and in a case where the determination is affirmed, the process proceeds to step S203A.

In step S206, the CPU 20A performs an authorization process based on the plug-in authorization information and ends a series of processes. That is, the process shown in FIG. 9 described above is performed.

On the other hand, in step S203A, the CPU 20A proceeds to step S203C with reference to the setting file 60 of the plug-in package 56.

In step S203C, the CPU 20A determines whether or not there is an administrator authentication flag. In the determination, for example, it is determined whether or not the administrator authentication flag is set in the setting file 60. In a case where the determination is denied, the process proceeds to step S204A, and in a case where the determination is affirmed, the process proceeds to step S204B.

In step S204A, the CPU 20A performs an authorization process based on the general user account information 64B and ends a series of processes. In the authorization process based on the general user account information 64B, the identical process is performed using the general user account information 64B instead of the account information 64, in the authorization process based on the account information shown in FIG. 7 described above.

On the other hand, in step S204B, the CPU 20A performs an authorization process based on the administrator account information 64A and ends a series of processes. In the authorization process based on the administrator account information 64A, the identical process is performed using the administrator account information 64A instead of the account information 64, in the authorization process based on the account information shown in FIG. 7 described above.

Second Exemplary Embodiment

In the first exemplary embodiment described above, an example in which the plug-in package 56 is installed in the image forming apparatus 12 and the plug-in is executed has been described, but the execution target device of the plug-in is not limited to the image forming apparatus 12. In the second exemplary embodiment, an example in which a server is applied as another example of the device will be described.

Figure 14:
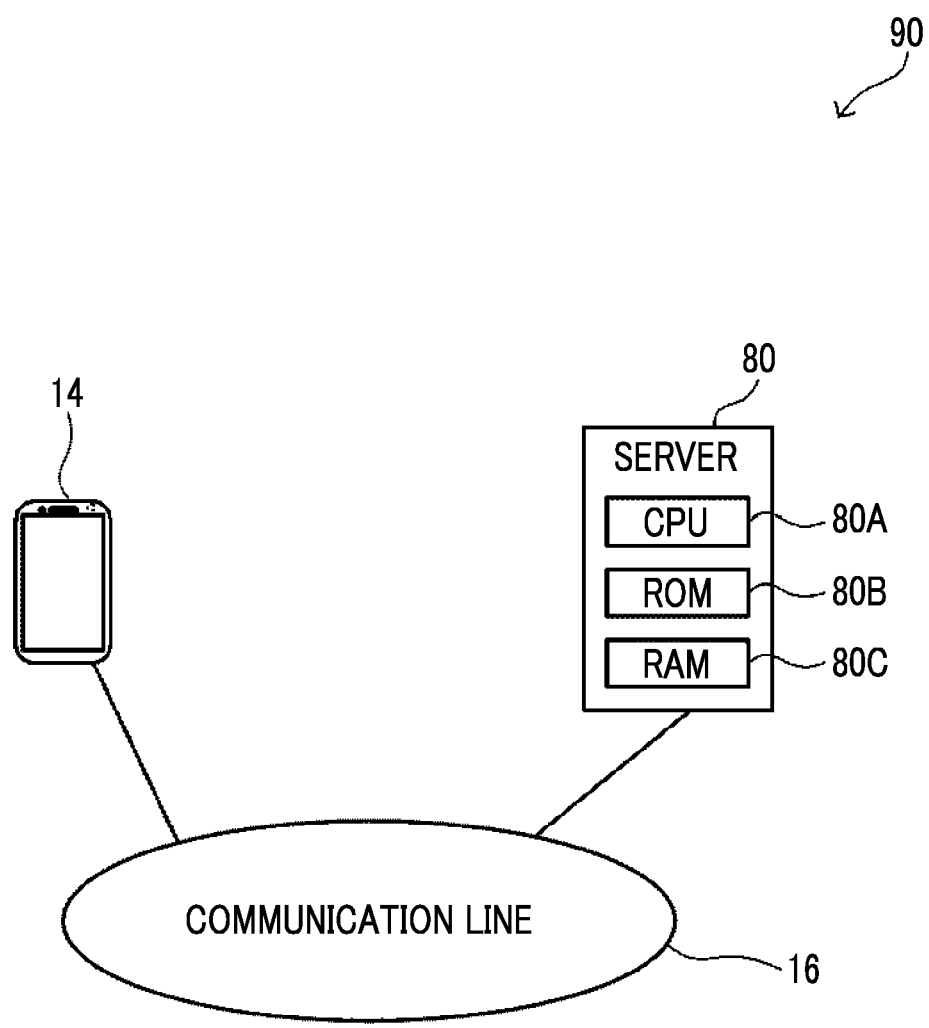
FIG. 14 is a diagram showing a schematic configuration of an information processing system according to a second exemplary embodiment.

For example, a server that uses an access token to authorize a web Application Programming Interface (API) is known, but an example in which a server that manages user's personal information and uses an access token to provide a web API is applied as the execution target device of the plug-in 58 will be described. FIG. 14 is a diagram illustrating the schematic configuration of an information processing system according to the second exemplary embodiment. Regarding the identical components with FIG. 1 are designated by the identical reference numerals, and detailed description thereof will be omitted.

The information processing system 90 according to the present exemplary embodiment is configured to include a mobile terminal apparatus 14 and a server 80 as an example of the information processing apparatus, and each is connected to a communication line 16.

Figure 15:
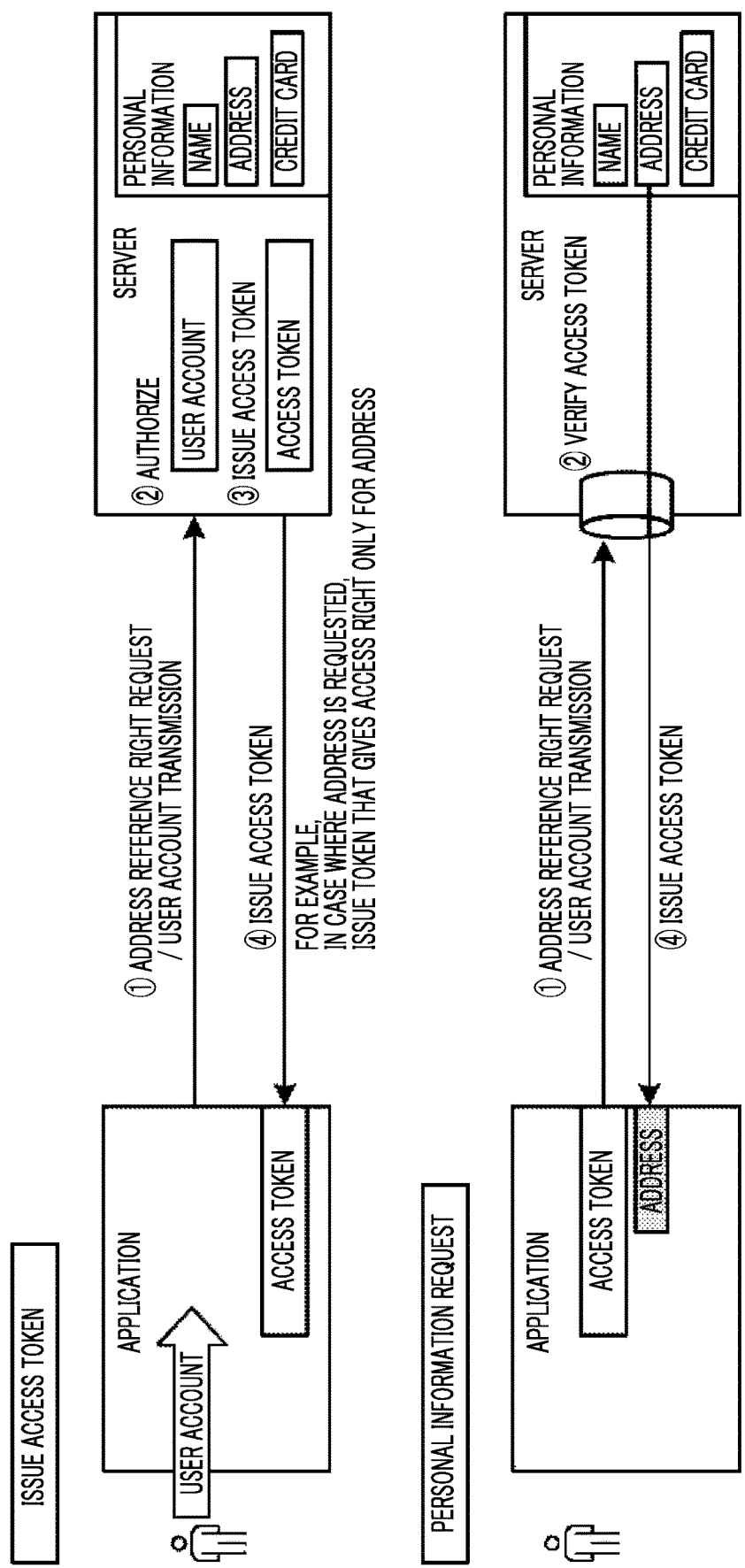
FIG. 15 is a diagram for explaining a known resource server that manages personal information on a user and uses an access token to provide a web API.

Here, with reference to FIG. 15, a known server that manages personal information on a user and uses an access token to provide a web API will be briefly described. FIG. 15 is a diagram for explaining a known resource server that manages personal information on a user and uses an access token to provide a web API.

When issuing an access token, in a case where the user account is input in the application, and the address reference authority request and the user account are transmitted to the server, and the server authenticates the user account and issues the access token to the application. For example, in a case where an address is requested, the server issues an access token that gives access to the address only.

When requesting personal information, the application transmits an address reference request to the server and an access token issued by the server to the server.

The server validates the access token and transmits the address of the personal information to the application that is the request source.

In such a server, in a case where there is no authentication function for authenticating the user, the access token cannot be issued. Therefore, in the present exemplary embodiment, the access token is issued by using the plug-in authorization information, as in the first exemplary embodiment described above.

Figure 16:
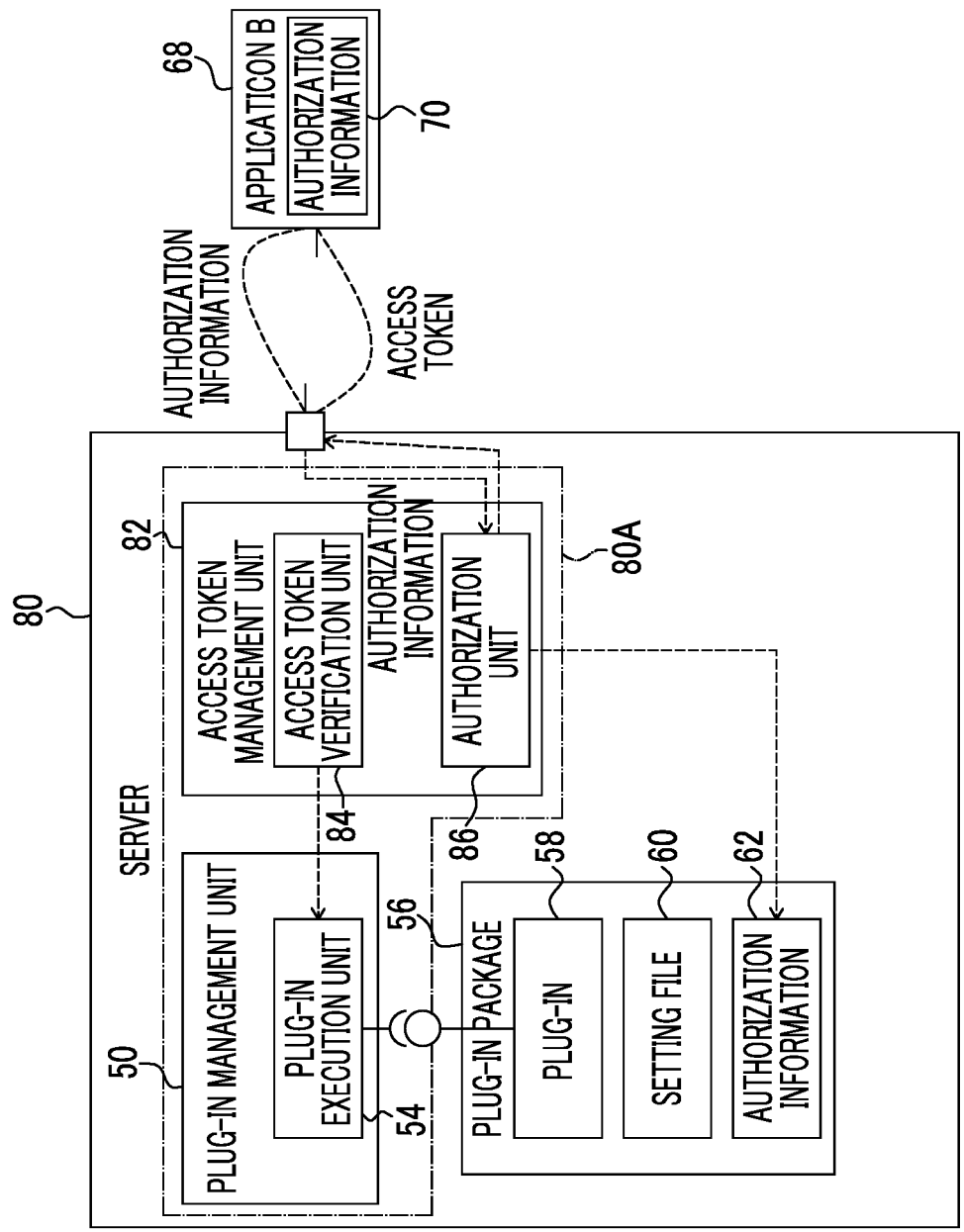
FIG. 16 is a functional block diagram showing a functional configuration of a server in the information processing system according to the second exemplary embodiment.

FIG. 16 is a functional block diagram showing a functional configuration of the server 80 in the information processing system 90 according to the present exemplary embodiment. The identical configuration to the functional configuration of the control unit 20 of the image forming apparatus 12 of FIG. 4 will be described with the identical reference numerals.

Similar to the control unit 20 of the image forming apparatus 12, the server 80 includes a CPU 80A, a ROM 80B, a RAM 80C, and the like, as shown in FIG. 14. Then, by the CPU 80A executing the program stored in the ROM 80B, the server 80 has the functions of the plug-in management unit 50 and the access token management unit 82, as shown in FIG. 16.

The plug-in management unit 50 has a function of a plug-in execution unit 54 that executes the plug-in 58 installed on the server 80. The plug-in execution unit 54 controls availability of execution of the plug-in according to the verification result of the access talk.

The access token management unit 82 has the functions of the access token verification unit 84 and the access token issuing unit 86.

The access token verification unit 84 verifies the access token transmitted from the outside such as the application B68, and notifies the plug-in execution unit 54 of the verification result.

In a case where the server 80 has an authentication function for authenticating a user, the access token issuing unit 86 requests a user account from an external apparatus such as the mobile terminal apparatus 14 in which application B68 is installed, and performs authentication based on the user account to issue an access token.

On the other hand, in a case where the server 80 does not have an authentication function for authenticating the user, the access token issuing unit 86 requests the authorization information 70 to be collated with the authorization information 62 unique to the plug-in 58 from an external apparatus such as the mobile terminal apparatus 14. Then, the authorization information 70 transmitted from the external apparatus is collated with the authorization information 62 unique to the plug-in 58, and an access token is issued. Thus, authorization for issuing an access token is performed even on a device that does not have an authentication function for authenticating the user.

Similar to the above embodiment, the plug-in package 56 includes a plug-in 58, a setting file 60 as an example of a setting function, and authorization information 62, and is installed in the image forming apparatus 12 by an administrator or the like of the image forming apparatus 12.

The plug-in 58 has a function of extending access from the outside of the image forming apparatus 12, and by executing the plug-in 58 from the outside, an access token can be issued as the execution of a predetermined function of the server 80.

The setting file 60 is a file in which the settings related to the execution of the plug-in 58 are stored, in which for example, it is possible to set whether to prioritize the authorization based on the account information or the authorization based on the authorization information. The plug-in package 56 may have a configuration in which the setting file 60 is omitted, that is, a configuration including the plug-in 58 and the authorization information 62.

The authorization information is information unique to the plug-in 58, and for example, a predetermined number of character strings including numbers, symbols, and the like are applied.

Subsequently, specific processes performed by each of the mobile terminal apparatus 14 and the server 80 in the information processing system 90 according to the present exemplary embodiment will be described.

As a preliminary preparation, the device administrator installs the plug-in package 56 on the server 80 in advance. The user also installs the application on the mobile terminal apparatus 14.

Figure 17:
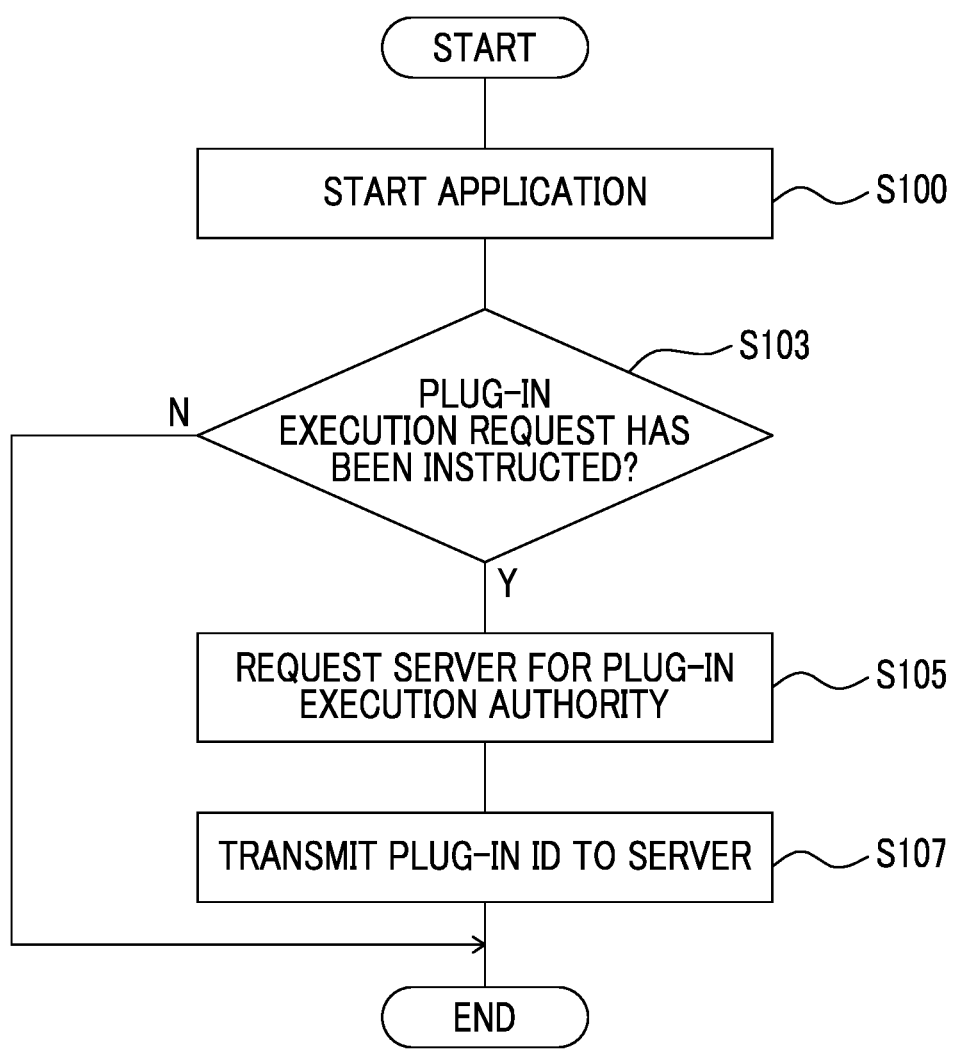
FIG. 17 is a flowchart showing an example of a processing flow in a case where an application is operated to request the server to execute a plug-in, in the mobile terminal apparatus of the information processing system according to the second exemplary embodiment.

First, after the preliminary preparation, the process of operating the application of the mobile terminal apparatus 14 to request the server 80 to execute the plug-in 58 will be described. FIG. 17 is a flowchart showing an example of a processing flow in a case where an application is operated to request the server 80 to execute the plug-in 58, in the mobile terminal apparatus 14 of the information processing system 90 according to the present exemplary embodiment. The identical process to the process in FIG. 5 will be described with the identical reference numerals. Further, the process of FIG. 17 starts, for example, in a case where the start of the application of the mobile terminal apparatus 14 is instructed.

In step S100, the CPU 14A starts the application instructed by the user and proceeds to step S103.

In step S103, the CPU 14A determines whether or not the plug-in execution request has been instructed. For example, it is determined whether or not an instruction such as a request for transmitting personal information of the application has been given. In a case where the determination is denied, the process is terminated and another process is performed. On the other hand, in a case where the determination is affirmed, the process proceeds to step S105.

In step S105, the CPU 14A requests the server 80 for the execution authority of the plug-in, and proceeds to step S107.

In step S107, the CPU 14A ends the process of transmitting the plug-in ID to the server 80 and requesting the execution of the plug-in 58.

Figure 18:
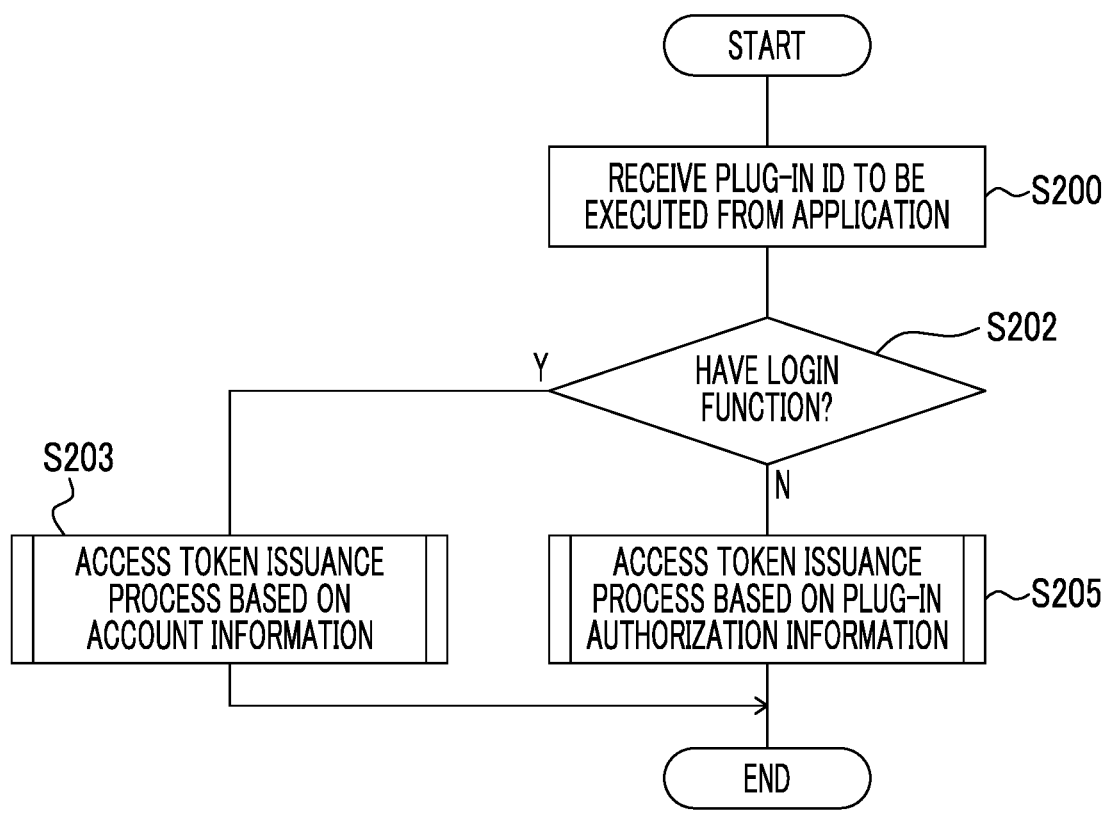
FIG. 18 is a flowchart showing an example of a flow of process performed by a server, in a case where an execution request of the plug-in is made from a mobile terminal apparatus, in the information processing system according to a second exemplary embodiment.

Subsequently, the process performed by the server 80 in a case where the mobile terminal apparatus 14 requests the execution authority of the plug-in will be described. FIG. 18 is a flowchart showing an example of a processing flow performed by the server 80, in a case where an execution request of the plug-in is made from a mobile terminal apparatus 14, in the information processing system 90 according to the present exemplary embodiment. The identical process to the process in FIG. 6 will be described with the identical reference numerals. Further, the process of FIG. 18 starts in a case where the plug-in ID is transmitted from the mobile terminal apparatus 14 to the server 80 in step S107 described above.

In step S200, the CPU 80A receives the plug-in ID to be executed from the application and proceeds to step S202. That is, the plug-in ID transmitted from the mobile terminal apparatus 14 in step S107 described above is received.

In step S202, the CPU 80A determines whether or not the server 80 has an authentication function for authenticating a user by a login function. In a case where the determination is affirmed, the process proceeds to step S203, and in a case where the determination is denied, the process proceeds to step S205.

In step S203, the CPU 80A performs an access token issuance process based on the account information and ends a series of processes. The access token issuance process based on the account information is performed in the identical manner to a known server that uses the above-described access token to provide a web API. That is, a user account is acquired from the mobile terminal apparatus 14, authentication is performed with the user account, and an access token is issued.

Figure 19:
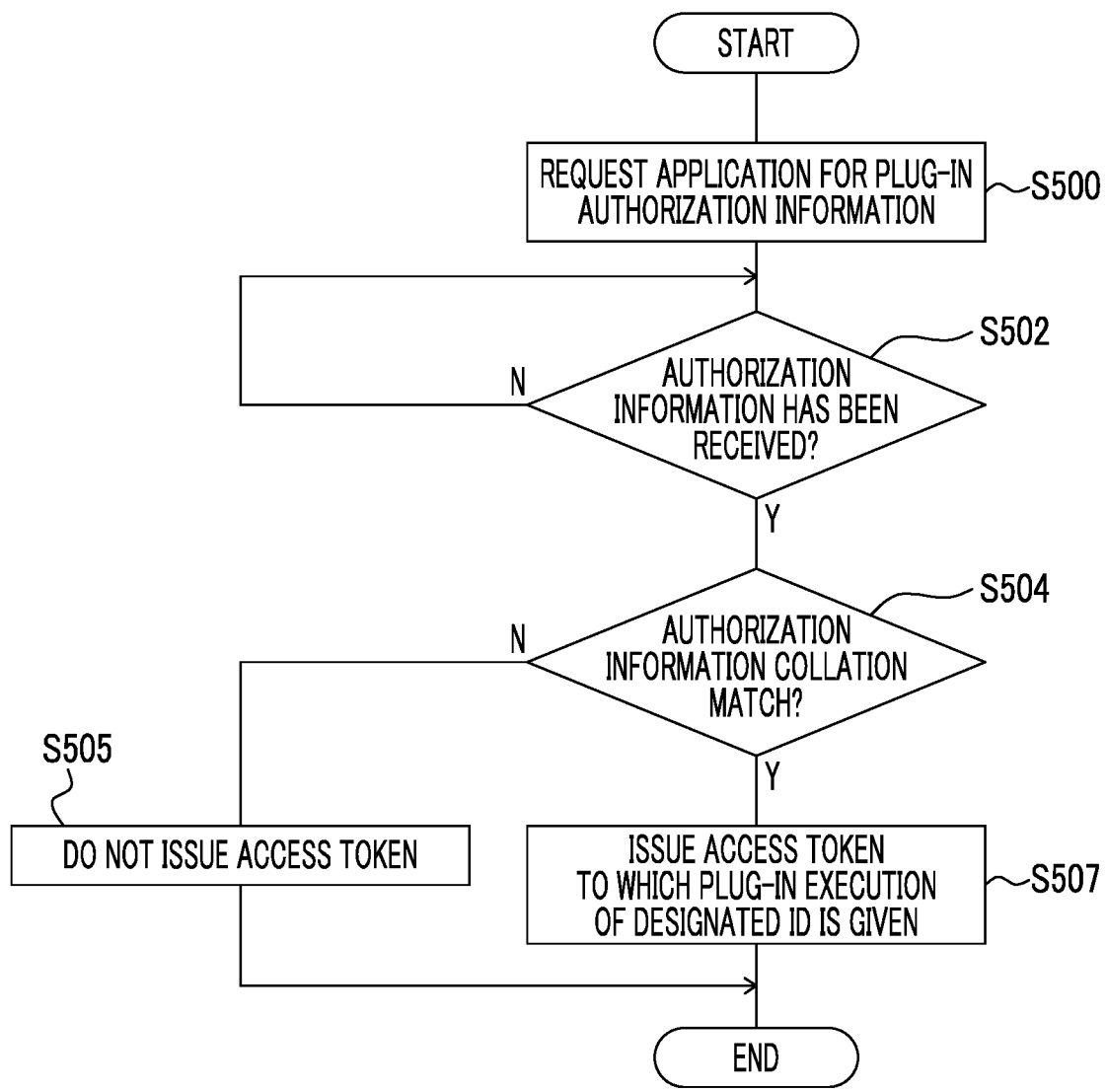
FIG. 19 is a flowchart showing an example of a flow of an access token issuance process based on the plug-in authorization information.

On the other hand, in step S205, the CPU 80A performs an access token issuance process based on the plug-in authorization information and ends a series of processes. The access token issuance process based on the plug-in authorization information is the process shown in FIG. 19. FIG. 19 is a flowchart showing an example of a flow of an access token issuance process based on the plug-in authorization information. The identical process to the process in FIG. 9 will be described with the identical reference numerals.

That is, in step S500, the CPU 80A requests the application of the mobile terminal apparatus 14 for the plug-in authorization information, and proceeds to step S502.

In step S502, the CPU 80A determines whether or not the authorization information has been received from the mobile terminal apparatus 14. The process proceeds to step S504 after waiting until the determination is affirmed. In a case the authorization information is not received even after the lapse of a predetermined time, the process may be terminated.

In step S504, the CPU 80A determines whether or not the authorization information 62 in the plug-in package 56 and the authorization information 70 received from the mobile terminal apparatus 14 match. That is, whether or not the plug-in 58 is executable is controlled by collating the authorization information 62 of the plug-in 58 with the authorization information 70 of the application of the mobile terminal apparatus 14. In a case where the determination is denied, the process proceeds to step S505, and in a case where the determination is affirmed, the process proceeds to step S507.

In step S505, the CPU 80A ends a series of processes without issuing an access token.

On the other hand, in step S507, the CPU 80A issues an access token to which the plug-in execution of the designated ID is given to the mobile terminal apparatus 14, and ends a series of processes.

Figure 20:
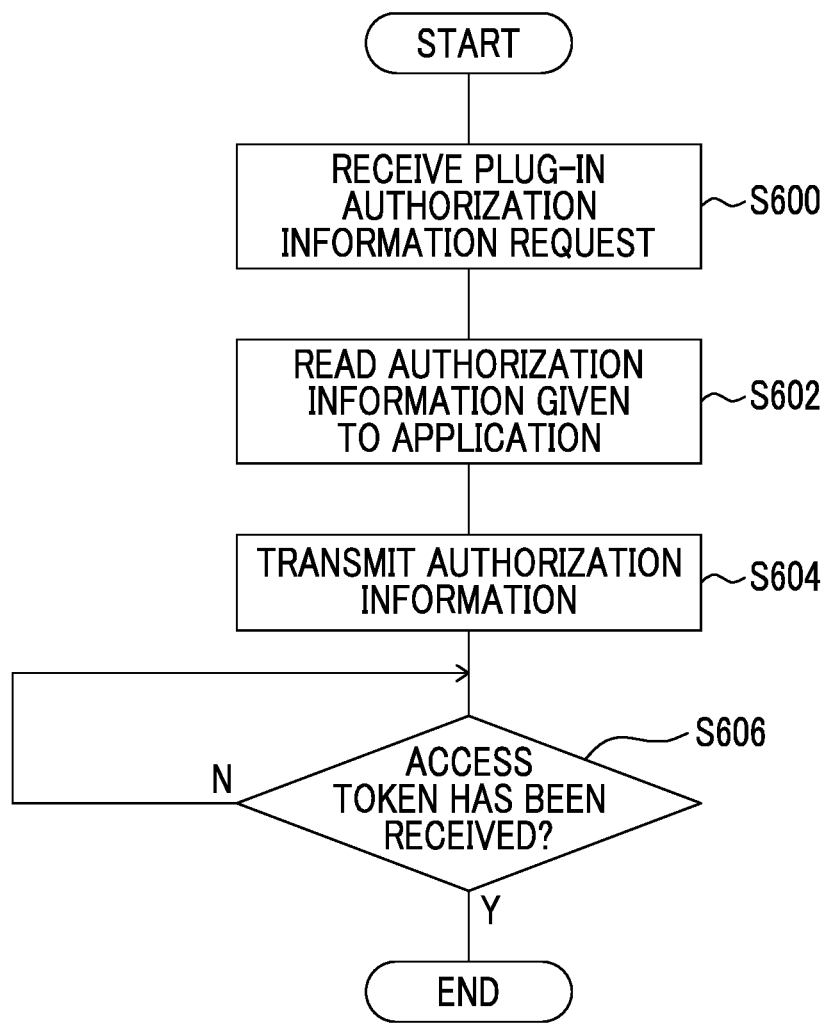
FIG. 20 is a flowchart showing an example of a flow of a process performed by the mobile terminal apparatus 14 in response to the access token issuance process based on the plug-in authorization information.

Next, the process performed by the mobile terminal apparatus 14 in response to the access token issuance process based on the plug-in authorization information performed by the server 80 will be described. FIG. 20 is a flowchart showing an example of a flow of a process performed by the mobile terminal apparatus 14 in response to the access token issuance process based on the plug-in authorization information. The identical process to the process in FIG. 10 will be described with the identical reference numerals. Further, the process of FIG. 20 starts in a case where the plug-in authorization information is requested from the server 80 in step S500 described above.

In step S600, the CPU 14A receives the plug-in authorization information request transmitted from the server 80, and proceeds to step S602.

In step S602, the CPU 14A reads the authorization information 70 given to the application and proceeds to step S604. Here, in a case where there is no authorization information 70, the process ends and the plug-in cannot be executed.

In step S606, the CPU 14A transmits the read authorization information 70 to the image forming apparatus 12, and proceeds to step S608.

In step S608, the CPU 14A determines whether or not the access token has been received. The CPU 14A waits until the determination is affirmed and ends a series of processes. In a case where the access token is not received even after the predetermined time has elapsed, the authorization information 70 may be retransmitted, or the user may be notified by displaying the access token acquisition failure on the display unit 14F or the like.

By performing this process, an access token is issued using the plug-in authorization information even in a case where the server does not have an authentication function for authenticating the user.

In each of the above exemplary embodiments, as an example of the authentication function for authenticating the user, an example in which the account information is stored in the image forming apparatus 12 or the server 80, and the account information is collated to perform authentication by the image forming apparatus 12 or the server 80 has been described, but the authentication function for authenticating the user is not limited to this. For example, a separate authentication server that authenticates the user is provided, the account information is stored in the authentication server, and the authentication server collates the account information. Then, the form in which the image forming apparatus 12 or the server 80 perform authentication by using the authentication result of the authentication server may be applied.

Further, in each of the above exemplary embodiments, an example has been described in which the authorization information 70 is acquired in a pull type in which the image forming apparatus 12 or the server 80 receives the authorization information 70 by requesting the authorization information 70 from the mobile terminal apparatus 14 that is the request source of the plug-in 58, but the present invention is not limited to this, and the authorization information 70 may be acquired in a push type. That is, in a case where the mobile terminal apparatus 14 requests the execution of the plug-in 58, the execution request of the plug-in 58 and the authorization information 70 may be transmitted together to the request destination. Further, in a case where the authorization information 70 is not stored in the application of the mobile terminal apparatus 14 in the push type, in a case where the execution of the plug-in 58 is requested, the user may operate the operation unit 14E to input the authorization information 70, and the input authorization information 70 may be transmitted together with the execution request.

Further, in each of the above exemplary embodiments, an example in which the execution of the plug-in 58 is requested from the mobile terminal apparatus 14 has been described, but the present invention is not limited to the mobile terminal apparatus 14, and the execution of the plug-in 58 may be requested from another apparatus such as a personal computer.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Further, the process performed in each part of the information processing systems 10 and 90 according to the above exemplary embodiments may be a process performed by software, a process performed by hardware, or a combination of both. Further, the process performed in each part of the information processing systems 10 and 90 may be stored in a storage medium as a program and distributed.

Further, the present invention is not limited to the above, and it goes without saying that the present invention can be variously modified and implemented within a range not deviating from the gist thereof.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor configured to:
      receive target authorization information to be collated, from an execution request source of a plug-in that extends access from an external apparatus, in a case of executing the plug-in, wherein the plug-in is installed in the information processing apparatus as a plug-in package including a setting function for setting whether to prioritize an authentication function for authenticating a user who uses the information processing apparatus or a process using unique predetermined authorization information owned by the plug-in and the target authorization information; and
      perform a process of controlling availability of execution of the plug-in according to the setting function.

2. The information processing apparatus according to claim 1, wherein the processor is configured to:
   in a case of requesting execution of the plug-in, perform a process of receiving the target authorization information from the execution request source of the plug-in, by requesting the target authorization information from the execution request source of the plug-in.

3. The information processing apparatus according to claim 2, wherein the processor is configured to:

perform a process of requesting the target authorization information from the execution request source of the plug-in, in a case where there is no authentication function for authenticating a user who uses the information processing apparatus.

4. The information processing apparatus according to claim 1, wherein the processor is configured to:
in a case of requesting execution of the plug-in, perform a process of receiving each of the execution request of the plug-in and the target authorization information from the execution request source of the plug-in.

5. The information processing apparatus according to claim 4,
wherein the target authorization information is info illation input by a user, in a case where execution request of the plug-in is made.

6. The information processing apparatus according to claim 1,
wherein the availability of execution of the plug-in corresponds to availability of issuance of a predetermined access token.

7. The information processing apparatus comprising:
a processor, configured to:
receive target authorization information to be collated, from an execution request source of a plug-in that extends access from an external apparatus, in a case of executing the plug-in, wherein the plug-in is installed in the information processing apparatus, as a plug-in package including an authentication setting function for setting whether to authenticate with the general user or the administrator or a process using unique predetermined authorization information owned by the plug-in and the target authorization information; and
perform a process of controlling availability of execution of the plug-in according to the setting function.

8. A non-transitory computer readable medium storing an information processing program causing a computer to execute a process comprising:
receiving target authorization information to be collated, from an execution request source of a plug-in that extends access from an external apparatus, in a case of executing the plug-in, wherein the plug-in is installed in the information processing apparatus as a plug-in package including a setting function for setting whether to prioritize an authentication function for authenticating a user who uses the information processing apparatus or a process using unique predetermined authorization information owned by the plug-in and the target authorization information; and
performing a process of controlling availability of execution of the plug-in according to the setting function.

* * * * *